US012619621B1

(12) United States Patent
Easwar et al.

(10) Patent No.: US 12,619,621 B1
(45) Date of Patent: May 5, 2026

(54) UNIFIED DATA ACCESS SYSTEM

(71) Applicant: Amazon Technologies, Inc., Seattle, WA (US)

(72) Inventors: Rahul Easwar, Issaquah, WA (US); Jose Kunnackal John, Bellevue, WA (US); Vinay Chopra, Bellevue, WA (US); Andrey Zubkov, Bothell, WA (US); Viraj Sanghvi, Seattle, WA (US); Tracy Daugherty, Bonney Lake, WA (US); Daniel Sunoh Choe, Plymouth, MN (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/994,242

(22) Filed: Nov. 25, 2022

(51) Int. Cl.
*G06F 16/2458* (2019.01)
*G06F 16/25* (2019.01)

(52) U.S. Cl.
CPC ........ *G06F 16/2477* (2019.01); *G06F 16/256* (2019.01)

(58) Field of Classification Search
CPC .......................... G06F 16/2477; G06F 16/256
See application file for complete search history.

(56) References Cited

U.S. PATENT DOCUMENTS

| | | | | |
|---|---|---|---|---|
| 8,463,549 B1 * | 6/2013 | Selman | ..................... | E21B 7/04 |
| | | | | 702/9 |
| 8,463,550 B1 * | 6/2013 | Selman | ................. | E21B 47/022 |
| | | | | 702/9 |
| 9,097,096 B1 * | 8/2015 | Selman | ..................... | E21B 7/04 |
| 10,305,758 B1 * | 5/2019 | Bhide | ............... | G06F 11/3409 |
| 11,238,048 B1 * | 2/2022 | Breeden | .............. | G06F 16/906 |
| 2006/0026521 A1 * | 2/2006 | Hotelling | .............. | G06F 3/0488 |
| | | | | 715/702 |
| 2006/0085756 A1 * | 4/2006 | Srivastava | ............ | G06F 3/0481 |
| | | | | 715/770 |
| 2007/0078555 A1 * | 4/2007 | Dorgelo | ................. | G05B 15/02 |
| | | | | 700/108 |
| 2015/0348066 A1 * | 12/2015 | Sewak | ................. | G06Q 10/063 |
| | | | | 705/7.31 |
| 2018/0181086 A1 * | 6/2018 | Kostyukov | ........ | G05B 23/0232 |
| 2021/0042324 A1 * | 2/2021 | Saeki | ..................... | G06F 16/27 |
| 2021/0182275 A1 * | 6/2021 | Su | ......................... | G06F 16/252 |

* cited by examiner

*Primary Examiner* — Vaishali Shah
(74) *Attorney, Agent, or Firm* — Knobbe, Martens, Olson & Bear, LLP

(57) ABSTRACT

Systems and techniques are disclosed for configuring and processing multiple types of data presentation objects in a unified data access system. An interface of the unified data access system may facilitate the configuration of both report data presentation objects having static data elements and dashboard data presentation objects having dynamic data elements. Both types of objects may be published for user access in a set of published data presentation objects. A user may activate both types of objects in a unified interface to simultaneously view and access data via processed report data presentation objects and dashboard data presentation objects.

20 Claims, 10 Drawing Sheets

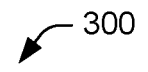

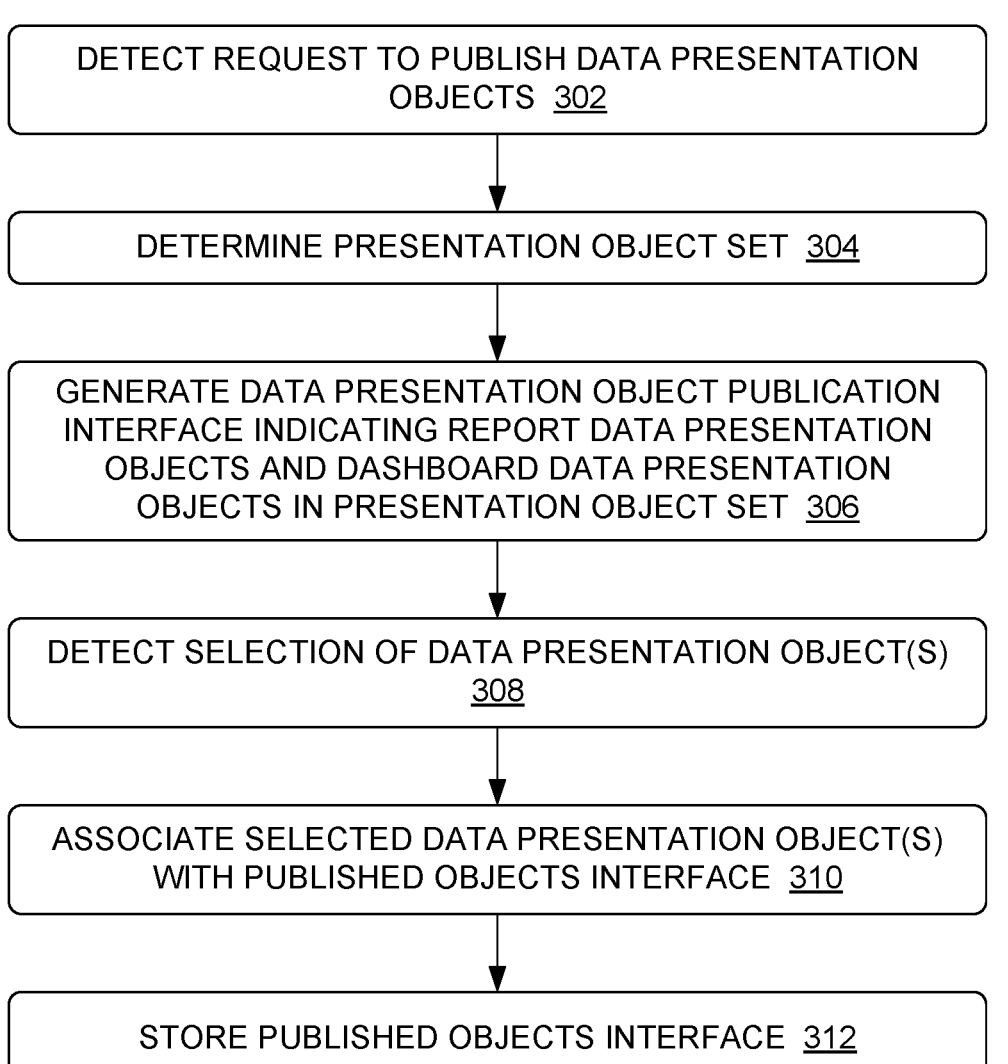

DETECT REQUEST TO PUBLISH DATA PRESENTATION OBJECTS  302

DETERMINE PRESENTATION OBJECT SET  304

GENERATE DATA PRESENTATION OBJECT PUBLICATION INTERFACE INDICATING REPORT DATA PRESENTATION OBJECTS AND DASHBOARD DATA PRESENTATION OBJECTS IN PRESENTATION OBJECT SET  306

DETECT SELECTION OF DATA PRESENTATION OBJECT(S) 308

ASSOCIATE SELECTED DATA PRESENTATION OBJECT(S) WITH PUBLISHED OBJECTS INTERFACE  310

STORE PUBLISHED OBJECTS INTERFACE  312

FIG. 3

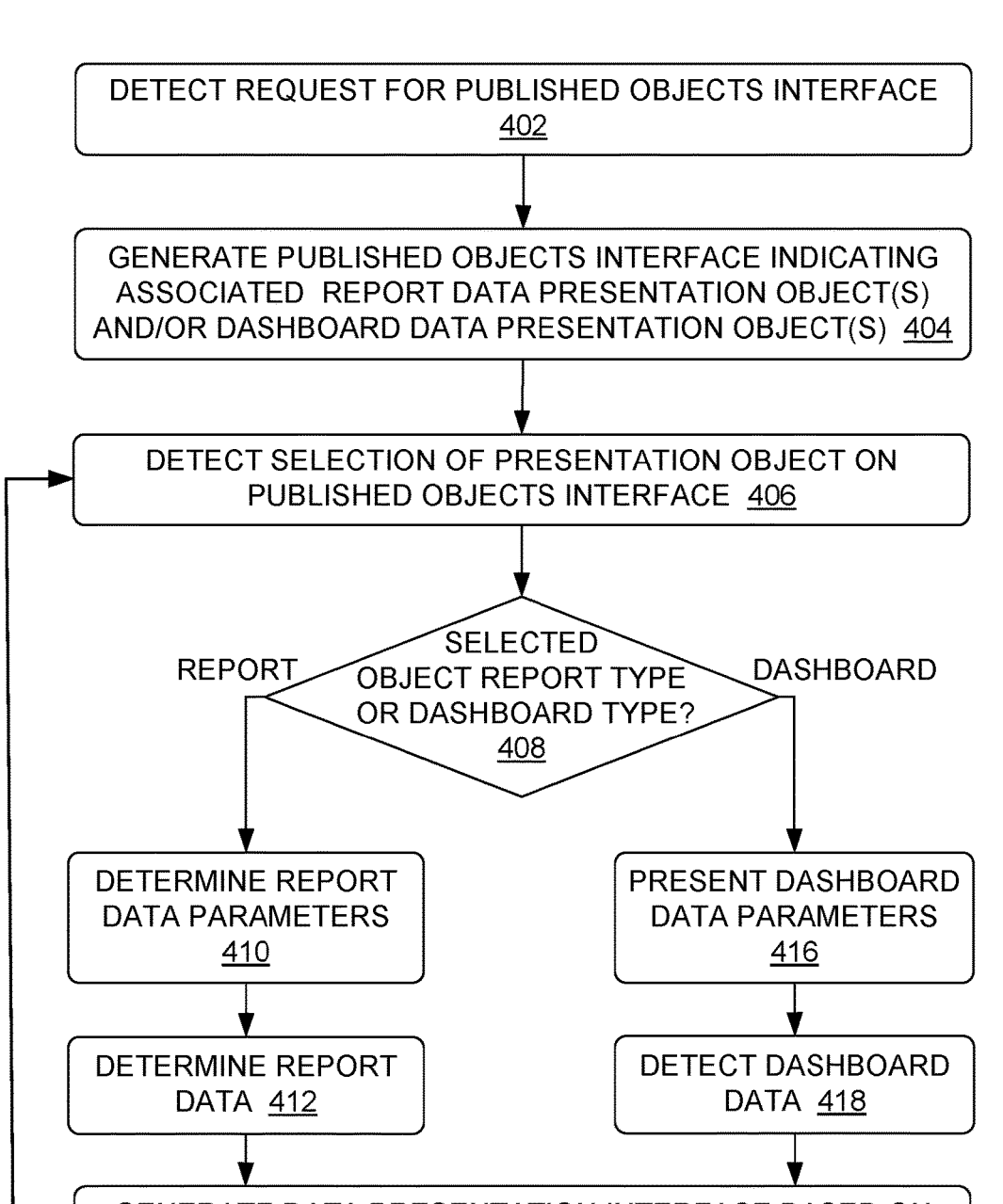

DETECT REQUEST FOR PUBLISHED OBJECTS INTERFACE
402

GENERATE PUBLISHED OBJECTS INTERFACE INDICATING ASSOCIATED  REPORT DATA PRESENTATION OBJECT(S) AND/OR DASHBOARD DATA PRESENTATION OBJECT(S)  404

DETECT SELECTION OF PRESENTATION OBJECT ON PUBLISHED OBJECTS INTERFACE  406

SELECTED OBJECT REPORT TYPE OR DASHBOARD TYPE?
408

REPORT                                        DASHBOARD

DETERMINE REPORT DATA PARAMETERS
410

PRESENT DASHBOARD DATA PARAMETERS
416

DETERMINE REPORT DATA  412

DETECT DASHBOARD DATA  418

GENERATE DATA PRESENTATION INTERFACE BASED ON DATA PRESENTATION OBJECT AND ASSOCIATED DATA  414

FIG. 4

UNIFIED DATA ACCESS SYSTEM

BACKGROUND

With the increase in computer processing capabilities and Internet connectivity, the use of data processing systems to perform and facilitate many routine functions and transactions has become nearly ubiquitous. The use of remote and decentralized data processing systems, often referred to as "cloud" systems, has also grown exponentially in recent years as network capacity and quality has improved. Many types of organizations and users interact with cloud data processing systems and other types of data processing systems to perform a variety of operations. For example, data processing systems are routinely used for sales transactions, financial transactions, social media interactions, providing entertainment content, controlling equipment and infrastructure, and storing any data related to such functions.

An operator of a data processing system may use the data processed and/or stored by such a system to determine conditions of an organization associated with the system. For example, current sales data may be used to determine current sales and inventory levels, which may then be used to make reactive (e.g., short term and/or immediate) business decisions related to operating a business. Historical sales data may be used to determine sales and inventory trends, which may then be used to make project business conditions and make strategic (long term and/or planning) business decisions.

To access current data in a typical data processing system, a "dashboard" type interface is used that presents current data and that may be dynamically updated as the data changes over time. Historical data in a typical data processing system is typically collected and presented in a "report" that represents a static collection of data for a particular time period in the past. Because the data used in reports and dashboards, and the means of collecting and determining such data, can vary greatly between dashboards and reports, for current data processing systems these forms of data collection and presentation are implemented by separate systems (e.g., a dashboard system and a distinct reporting system) that each have different requirements, interfaces, user environments, etc. These separate and distinct systems can make it challenging for a system operator to easily consume the data it may need to make sound organizational decisions.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates a flow diagram of an example method for publishing a data presentation object in a unified data access system.

FIG. 4 illustrates a flow diagram of an example method for generating a data presentation interface using a data presentation object in a unified data access system.

DETAILED DESCRIPTION

Figure 1:
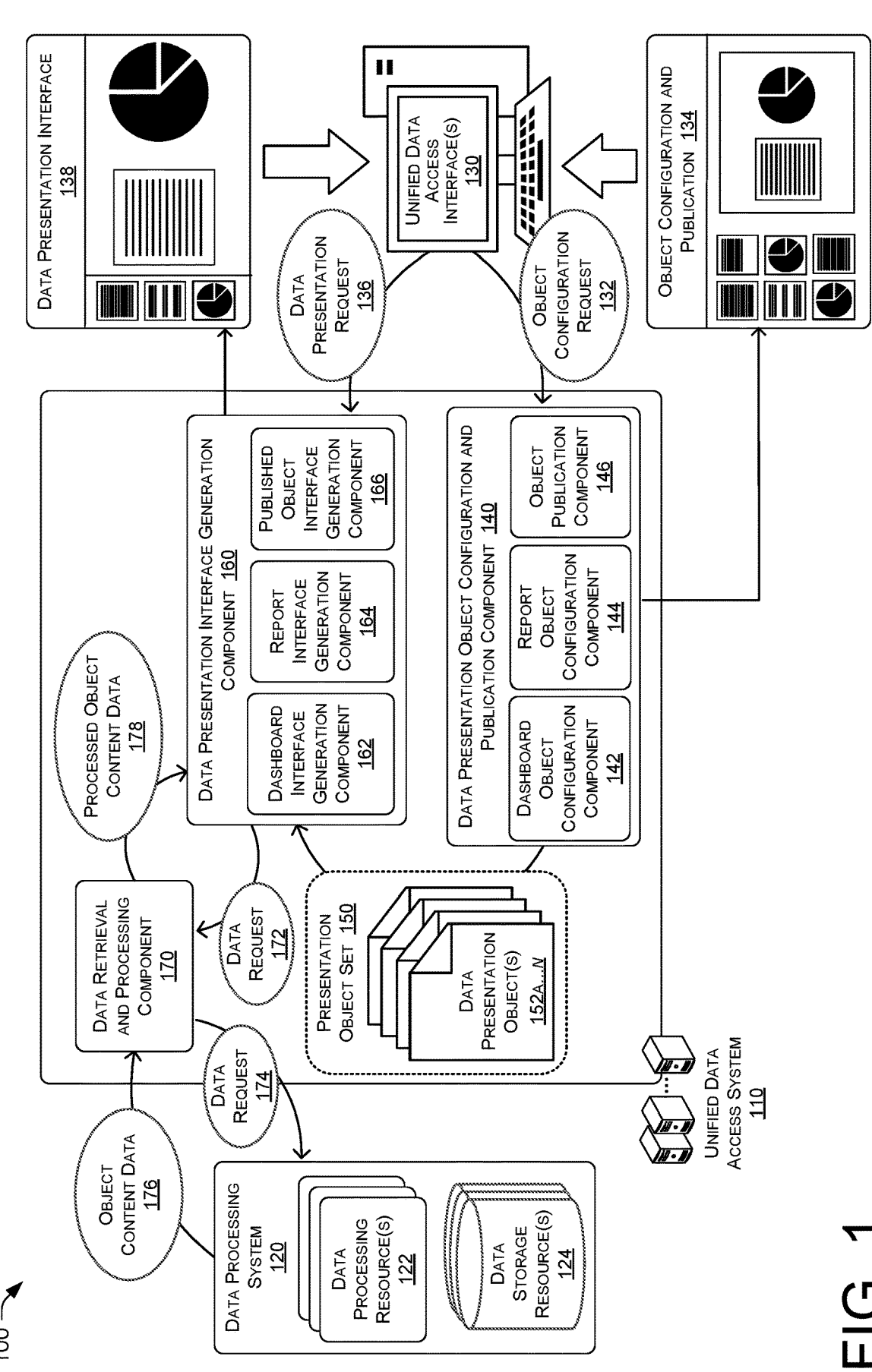
FIG. 1 illustrates a system-architecture diagram of an example environment in which a unified data access system may be implemented.

A data processing system, such as a cloud data processing system, may be used to process and store data for system operators and customers of various types. For example, a business may be an operator of such a system and may provide access to the data processing system to perform sales and/or financial transactions. This access may be provided, for example, to employees of the business to allow the employees to perform various functions related to operating the business and/or to customers of the business to allow such customers to directly and electronically interact with the business (e.g., purchase goods or services electronically, request and/or update account data, etc.). The data processed and generated by such a system may provide value to the system operator by providing current and historical information about various aspects of the business (e.g., sales information, inventory information, customer information, etc.).

Data associated with such a data processing system may be categorized as current data and/or historical data. Current data may represent a current and ongoing data state (including recent past data) that may be updated over time. Historical data may represent data that has been determined and stored (e.g., at a data storage resource) and may be associated with a particular time period. There may be some overlap between current data and historical data. For example, recent past data may also be historical data for the time period associated with the recent past.

The means of accessing and presenting historical data and current data may vary significantly between these data types.

Current data may be collected and presented in a "dashboard" interface. A dashboard interface may include one or more dynamic data elements that may be associated with particular types of data. These dynamic elements may be updated in an ongoing manner so that they represent recent data (e.g., the most recent available data). For example, a dashboard may include a dynamic sales data element that represents the current sales (e.g., for the day up through the current time) for one or more stores and that may be updated over time to maintain a representation of current data. This dashboard may also include a dynamic inventory data element that represents a current inventory level for one or more particular items at these one or more stores. In order to present current information, this dashboard interface may be configured to request and/or receive sales and inventory data from a data processing systems regularly (e.g., every minute, every 5 minutes, once an hour, etc.). Alternatively or additionally, a data processing system may be configured to "push" or otherwise provide sales and inventory data to the dashboard interface and/or its associated data elements regularly (e.g., as it becomes available, every minute, every 5 minutes, once an hour, etc.).

Historical data may be collected and presented in a "report" interface. A report interface may be paginated to resemble a printed report and/or to facilitate the presentation of such a report on a physical medium (e.g., paper). A report may be associated with a particular time period and may include one or static data elements that may be associated with particular types of data. A static element may represent the data associated with the element for the time period associated with the report. For example, a report may be associated with a particular month and may include a static sales data element that represents the total sales for that month at one or more stores. Such a report may also include a static inventory data element that represents one or more inventory levels for one or more particular items for that month for at these one or more stores (e.g., inventory at the beginning of that month, inventory at the end of that month, units sold in that month, etc.). A report may be generated in response to an instruction (e.g., operator or user instruction) and/or automatically (e.g., periodically, in response to one or more conditions, etc.). In contrast to a dashboard, because a report represents data for a particular historical time period, the data in a report may not be updated or otherwise changed once the report is generated. Reports may be saved for future access and retrieved at any time. In various examples, a report may include dynamic elements and/or controls that may provide access to dynamic data, such as links or buttons that may allow a user to access dynamic data from a report. A report may also, or instead, include one or more controls that modify the presentation of the data in the report. For example, a report may have a control that lets a user filter and/or sort the data represented in the report. A report may also, or instead, have a control that allows a user to specify the presentation format (e.g., PowerPoint® ("ppt"), Hyper-Text Markup Language (HTML), Portable Document Format (".pdf") format, etc.).

The implementations of dashboard systems and reporting systems have traditionally been very different due to the differing requirements for accessing, processing, and presenting the data associated with these distinct types of data presentations. Because of these different requirements, entirely distinct software and hardware systems have typically been used to generate dashboards and reports. These distinct reporting and dashboard systems will typically have separate installation and maintenance requirements, different user training requirements, different output styles and/or formats, etc. This results increased cost and complexity for a data processing system operator. A unified data access system as described herein may provide a single system that facilitates the generation of both dashboard interfaces and reporting interfaces, thereby reducing cost and complexity and increasing the efficiency of a data processing system.

A unified data access system may provide a uniform and consistent user experience for configuring, publishing, and generating data presentation objects of multiple types. In various examples, a data presentation object may be a dashboard data presentation object or a report data presentation object. A unified data access system may generate a data presentation object configuration interface that allows a user to configure either type (or any other type) of data presentation object. For example, a data presentation object configuration interface may allow a user to configure one or more dynamic data elements on dashboard data presentation object and one or more attributes of such elements and/or of the dashboard data presentation object. This same data presentation object configuration interface may also allow a user to configure one or more static data elements on report data presentation object and one or more attributes of such elements and/or of the report data presentation object (e.g., schedule of report generation, a time period associated with the report, etc.). The disclosed data presentation object configuration interface may also, or instead, allow a user to configure one or more data elements on either or both of a report data presentation object and a dashboard data presentation object, where such data elements may be compatible and/or configurable on either type of data presentation object. As with other data elements, the data presentation object configuration interface may facilitate the configuration of one or more attributes of such elements and/or of the associated data presentation object. The unified data access system may then allow the user to store and associate configured data presentation objects of either type with a presentation object set.

The unified data access system may generate a data presentation object publication interface that allows a user to publish both report data presentation objects and dashboard data presentation objects for access by a user in a single unified published data presentation object interface. For example, while in traditional systems a user would have to access and interact with two separate systems to access and/or generate a dashboard interface and a report interface, the unified data access system allows an operator to publish one or more dashboard data presentation objects alongside one or more report data presentation objects on a single user interface.

The unified data access system may then generate a published data presentation objects interface for a user to select and/or generate any one or more of the data presentation objects indicated on that interface. For example, as described herein, the published data presentation objects interface may include indications of both report data presentation objects and dashboard data presentation objects, allowing a user to access both types of data presentation objects on a single interface. In response to selection of one or more such data presentation objects, the unified data access system may then generate a data presentation interface based on the selected data presentation object (e.g., as a dashboard or a report), collecting and processing the associated data as needed based on the data presentation object attributes and data. This data presentation interface may be generated based on the same user selection action(s) regardless of the data presentation object selected, thereby not requiring the user to perform any actions or operations that are dependent on the type of data presentation object selected.

The disclosed systems and techniques provide a more efficient means of accessing data from a data processing system and generating data presentation interfaces of a variety of types while minimizing user and system requirements. By facilitating more efficient access and generation of a variety of types of data presentation objects and interfaces, the examples described herein may provide faster and more efficient means of determining and presenting data associated with a data processing system while also reducing resource utilization and requirements. For example, in the disclosed system, both report data presentation objects and dashboard data presentation objects may be configured, published, and used to generate data presentation interfaces in a single unified data access system environment. In current systems, it is resource intensive and cumbersome to collect and present report data using a first system and dashboard data using a second, distinct system, and then implement intermediary technology to aggregate such data for user consumption.

By enabling the aggregation and presentation of report data and dashboard data in a unified data access system by configuring and processing the data presentation objects as described herein, as well as other types of data presentation objects, in a single system and environment, there may be less data to process in generating data presentation interfaces, thereby reducing the number of processor cycles needed to generate the various presentation interfaces, memory resources to store the associated data, and network resources required to request and receive the associated data. Because the instant systems and techniques enable a single unified system to generate the presentation interfaces, the resource utilization of the data processing system(s) that provide the data for presentation interfaces is similarly reduced. Furthermore, by using a unified environment and interfaces, the unified data access systems and techniques described herein may reduce user training requirements and expedite presentation of data, thereby increasing the efficiency and reducing the costs of obtaining data that may be significant in making resource and business allocation determinations. Thus, the disclosed systems and techniques help acquire and present data associated with one or more data processing systems of any type while minimizing inefficacies and improving the performance of both the data processing systems and the associated data presentation interface generation systems.

The techniques and systems described herein may be implemented in a number of ways. Example implementations and additional details are provided below with reference to the following figures.

FIG. 1 is a block diagram of an illustrative environment 100 that may be a portion of, or otherwise associated with, a cloud data processing and storage system or any other type of data processing and/or storage system. The environment 100 may include a unified data access system 110 and a data processing system 120. The environment 100 may also include unified data access interface(s) 130 that may facilitate user interaction with the unified data access system 110 and presentation of data object generation and data presentation interfaces to a user. The systems 110 and 120, as well as the interface(s) 130, may each represent one or more physical and/or logical resources, such as one or more server computers, virtual machines, software resources, databases, notebooks clusters, datasets, etc., or any combination thereof.

The unified data access system 110 may be configured with various components and to perform various operations as described herein to provide a unified data access environment for a user. In various examples, the unified data access system 110 may include a data presentation object configuration and publication component 140 that facilitate the configuration of one or more data presentation objects of any type. For example, the data presentation object configuration and publication component 140 may include a dashboard object configuration component 142 that may facilitate the configuration of a dashboard data presentation object as described herein. The data presentation object configuration and publication component 140 may also, or instead, include a report object configuration component 144 that may facilitate the configuration of a report data presentation object as described herein. The data presentation object configuration and publication component 140 may also, or instead, include one or more other object configuration components that may facilitate the configuration of one or more other types of data presentation objects.

The data presentation object configuration and publication component 140 may also, or instead, include an object publication component 146 that may facilitate the publication of one or more data presentation objects as described herein. For example, the object publication component 146 may facilitate the publication of both report data presentation objects and dashboard data presentation objects in a unified data presentation interface for user selection and activation.

In various examples, the unified data access system 110 may also, or instead, include a data presentation interface generation component 160 that may facilitate the generation of one or more data presentation interfaces of any type based on one or more corresponding data presentation objects. For example, the data presentation interface generation component 160 may include a dashboard interface generation component 162 that may generate one or more dashboard interfaces based on one or more corresponding dashboard data presentation objects. The data presentation interface generation component 160 may also, or instead, include a report interface generation component 164 that may generate one or more report interfaces based on one or more corresponding report data presentation objects.

The unified data access system 110 may exchange data and/or otherwise interact with the data processing system 120 via a data retrieval and processing component 170. The data retrieval and processing component 170 may perform communications functions and data processing on behalf of other components of the unified data access system 110. Alternatively or additionally, the data retrieval and processing component 170 may relay data between components of the unified data access system 110 and one or more systems external to the unified data access system 110, such as the data processing system 120.

The data processing system 120 may be any type of data processing system or combination of systems. The data processing system 120 may include one or more data processing resources 122 and one or more data storage resources 124. Such resources may be configured to process and/or store any type and amount of data. The data processing system 120 therefore represents any type of data processing system operated by any type of operator, such as a retail transaction system, financial services system, social media system, etc. In various examples, the unified data access system 110 interacts with the data processing system 120 to access data that is used to generate one or more data presentation interfaces based on one or more corresponding data presentation objects as described herein.

The unified data access interface(s) 130 may be one or more interfaces as described herein that facilitate the generation one or more data presentation objects and data presentation interfaces. The unified data access interface(s) 130 may be presented to a user on a user device, terminal, system, etc. that facilitates user interaction with the unified data access system 110. For example, unified data access interface(s) 130 may include one or more web pages or browser rendered interfaces that represent the interfaces and data described herein.

As noted, the data presentation object configuration and publication component 140 may facilitate the configuration and processing of one or more data presentation objects. Such objects may be logically organized into sets of objects. For example, the data presentation object configuration and publication component 140 may generate one or more of data presentation objects 152*a* . . . *n* that may be associated with presentation object set 150. This set of objects 150 and/or one or more of the data presentation objects 152 associated therewith may be provided by the presentation object configuration and publication component 140 to the data presentation interface generation component 160 for use in facilitating data presentation object selection and data presentation interface generation.

In various examples, the users that may be permitted to access the data presentation object configuration and publication component 140 may be a subset of normal users. For example, only "author" users or users with data presentation object configuration and/or publication privileges may be permitted to access the data presentation object configuration and publication component 140 and/or otherwise configure and/or publish data presentation objects. In such examples, access to such objects for the purposes of generating interfaces via the data presentation interface generation component 160 may be available to larger set of users because such access only allows for the viewing of data generated based on data presentation objects, rather than the configuration and modification of unified data access system data permitted by access to the data presentation object configuration and publication component 140.

For example, a user (e.g., "author" user) interacting with the unified data access interface(s) 130 may initiate a request 132 to configure and/or publish one or more data presentation objects. The request 132 may be a request to configure a report data presentation object and/or a dashboard data presentation object. The request 132 may also, or instead, be a request to publish one or more such objects. This request may be provided to the data presentation object configuration and publication component 140.

In response to the request 132, the data presentation object configuration and publication component 140 may generate the object configuration and publication interface 134 that may be presented to user via the unified data access interface(s) 130. For example, if the request 132 is a request to configure a dashboard data presentation object, the dashboard object configuration component 142 may generate the object configuration and publication interface 134 with various attributes and/or controls that allow a user to configure a dashboard data presentation object, for example, as described herein. In another example, if the request 132 is a request to configure a report data presentation object, the report object configuration component 144 may generate the object configuration and publication interface 134 with various attributes and/or controls that allow a user to configure a report data presentation object, for example, as described herein.

In another example, if the request 132 is a request to publish one or more data presentation objects, the object publication component 146 may generate the object configuration and publication interface 134 with various attributes and/or controls that allow a user to select one or more data presentation objects for publication. For example, as described in more detail herein, the object configuration and publication interface 134 may provide an indication of (e.g., all) available data presentation objects and may allow a user to select those to be included in a particular presentation object set. For example, the user may select the objects 152*a* . . . *n* to be included in the presentation object set 150. The data presentation object configuration and publication component 140 may then provide the presentation object set 150 to the data presentation interface generation component 160 for use in data presentation interface selection and generation.

For example, a user interacting with the unified data access interface(s) 130 may initiate a request 136 for the presentation of data based on one or more data presentation objects. The request 132 may be a request to provide an interface to facilitate the selection of one or more such objects and/or a request to generate an interface based on one or more such objects. For example, the request 136 may be a request for available data presentation objects. The published object interface generation component 166 may determine the object(s) to present to such a user. For example, published object interface generation component 166 may determine, based on the user's permissions, user type, parameters in the request 136, etc. that the user is permitted to access a particular set of one or more data presentation objects. The published object interface generation component 166 may then generate a data presentation interface 138 that includes indications of such objects. For example, the published object interface generation component 166 may determine that the user has sufficient permission to access the presentation object set 150. In response, the published object interface generation component 166 may generate the data presentation interface 138 to include indications of the data presentation object(s) 152*a* . . . *n*.

In response to a selection of a data presentation object on the data presentation interface 138 and/or where the request 136 is a request to present data based on such an object, the data presentation interface generation component 160 may process and generate the corresponding data to generate an interface with the associated data. For example, where the selection and/or request 136 is associated with a dashboard data presentation object, the dashboard interface generation component 162 may determine, based on the indicated dashboard data presentation object, the data that may be used to generate an interface based on the object. The dashboard interface generation component 162 may generate a data request 172 that may be provided to the data retrieval and processing component 170. The data retrieval and processing component 170 may generate a data request 174 that may be provided to the data processing system 120 requesting data based on the data request 172. The data processing system 120 may responsively provide the object content data 176 that may be used to determine the data associated with the indicated dashboard data presentation object. The data retrieval and processing component 170 process this received data to generate the processed object content data that may then be provided to the dashboard interface generation component 162. Using this data, the dashboard interface generation component 162 may generate the data presentation interface 138 based on the received data and the corresponding dashboard data presentation object.

In another example, where the selection and/or request 136 is associated with a report data presentation object, the report interface generation component 164 may determine, based on the indicated report data presentation object, the data that may be used to generate an interface based on the object. The report interface generation component 164 may generate a data request 172 that may be provided to the data retrieval and processing component 170. The data retrieval and processing component 170 may generate a data request 174 that may be provided to the data processing system 120 requesting data based on the data request 172. The data processing system 120 may responsively provide the object content data 176 that may be used to determine the data associated with the indicated report data presentation object. The data retrieval and processing component 170 process this received data to generate the processed object content data that may then be provided to the report interface generation component 164. Using this data, the report interface generation component 164 may generate the data presentation interface 138 based on the received data and the corresponding report data presentation object.

An illustrative example will now be described in reference to FIG. 1. An operator of the data processing system 120 may be a retailer with several physical store locations. The operator may wish to provide a dashboard of inventory of a particular item at individual store locations to store managers so that the managers may have items delivered between stores as necessary to reduce the likelihood that any individual store will run out of inventory when other stores may be overstocked of the item. The operator may also wish to have reports of inventory levels for the item or each week to identify trends in item sales and improve item ordering to help maintain sufficient stock of the item at each store without overstocking.

An "author" user associated with the operator may interact with the unified data access interface(s) 130 to request the configuration and publication of data presentation objects to achieve these goals. For example, the author user may request 132 a dashboard object configuration interface that the author user may use to interact with the dashboard object configuration component 142 of the data presentation object configuration and publication component 140 to configure a dashboard data presentation object with one or more dynamic data elements configured to show a current inventory level of the particular item at each store ("item inventory dashboard data presentation object") and configured to update with current data (e.g., periodically, as available, etc.). The author user may also configure this item inventory dashboard data presentation object with one or more data elements that may be used on either dashboard data presentation objects or report dashboard data presentation objects.

The author user may further request 132 a report object configuration interface that the author user may use to interact with the report object configuration component 144 of the data presentation object configuration and publication component 140 to configure a report data presentation object with one or more static data elements configured to show the inventory level of the particular item at each store at the end of each week ("item inventory report data presentation object"). The author user may also configure this item inventory report data presentation object with one or more data elements that may be used on either dashboard data presentation objects or report dashboard data presentation objects. The author user may further configure this item inventory report data presentation object to generate a report weekly that may be stored and available via the data presentation interface 138 and/or the unified data access system 110. The author user may also, or instead, configure this report data presentation object to provide this report (e.g., a link to the report and/or as a paginated electronic document) to the operator upon generation. The author user may configure controls or data elements on the item inventory report data presentation object that allow a user to modify the presentation of report data on the report. For example, the report object configuration interface may facilitate the configuration of one or more controls on the item inventory report data presentation object that allow the user to filter, sort, paginate, etc. the data presented in the interface generated based on the item inventory report data presentation object.

In various examples, the author user may configure the item inventory report data presentation object to be rendered and/or presented in one or more forms or formats. For example, the author user may configure this report data presentation object to be presented in, or have to option to be presented in, PowerPoint® (".ppt") format, HyperText Markup Language (HTML) format, Portable Document Format (".pdf") format, etc. Controls (e.g., implement via data elements or otherwise) configured on such a report may operate based on controls and/or other options that may be facilitated by the format in which the data presented in the interface generated based on the item inventory report data presentation object is presented.

The author user may request 132 an object publication interface that the author user may use to interact with the object publication component 146 of the data presentation object configuration and publication component 140 to publish the configured dashboard data presentation object and report data presentation object as objects 152 of the presentation object set 150. The author user may set attributes, permissions, parameters, etc. for the set 150 and/or for one or more of the object 152 to control access to the set and/or objects. The object publication component 146 may provide the set 150 to the data presentation interface generation component 160.

A store manager user may interact with the unified data access interface(s) 130 to request one or more data presentation objects to view the inventory data for the particular item. For example, the store manager user may request 136 an interface that includes the data presentation objects available to the store manager user. In response to the request 136, the published object interface generation component 166 may determine the one or more data presentation objects that may be available to the store manager user. For example, the published object interface generation component 166 may determine, based on the store manager user's permissions, that the store manager user is permitted to access item inventory dashboard data presentation object and the item inventory report data presentation object configured by the author user as described above. The published object interface generation component 166 may then generate the data presentation interface 138 to include indications of these objects. For example, the published object interface generation component 166 may determine that the store manager user is associated with the presentation object set 150 and may therefore responsively generate the data presentation interface 138 to indicate the objects 152. The objects 152 may include both one or more dashboard data presentation objects and one or more report data presentation objects, such as the item inventory report data presentation object and the item inventory dashboard data presentation object described in this example.

The store manager user may then select one of these indications on the interface 138. For example, the store manager user may select the item inventory dashboard data presentation object configured by the author user as described above. In response, the dashboard interface generation component 162 may generate the data request 172 to request current inventory levels for the particular item from the data processing system 120 via the data retrieval and processing component 170. In response to the request 172, the data retrieval and processing component 170 may obtain and provide the current inventory levels as processed object content data 178 after processing inventory level data contained in the object content data 176 provided by the data processing system 120 in response to a request 174 initiated by the data retrieval and processing component 170. The dashboard interface generation component 162 may then generate the data presentation interface 138 to include presentation of the current inventory data based on the selected item inventory dashboard data presentation object and the processed object content data 178. The dynamic elements associated with the item inventory dashboard data presentation object on presentation interface 138 may update as configured to present real-time, current, or otherwise recent data to the store manager user.

To continue this example, the store manager user may also, or instead, select the item inventory report data presentation object configured by the author user as described above. In response, the report interface generation component 164 may generate the data request 172 to request inventory levels for the particular item for the time frame associated with the item inventory report data presentation object from the data processing system 120 via the data retrieval and processing component 170. In response to the request 172, the data retrieval and processing component 170 may obtain and provide the applicable inventory levels as processed object content data 178 after processing inventory level data contained in the object content data 176 provided by the data processing system 120 in response to a request 174 initiated by the data retrieval and processing component 170. The report interface generation component 164 may then generate the data presentation interface 138 to include presentation of the inventory data for the time period based on the selected item inventory dashboard data presentation object and the processed object content data 178.

As will be appreciated, by providing a unified means of configuring, generating, and accessing both dashboard data presentation object and report data presentation objects, and their associated interfaces, the systems and methods described herein may be faster, more efficient, and more robust than conventional systems and methods, as they may eliminate the need for separate dashboard and reporting systems, thereby reducing the processing and memory resources required to collect and present various types of data processed and/or stored at a data processing system. That is, the systems and methods described herein provide a technological improvement over existing data presentation techniques for data processing systems that involve separately maintaining and operating distinct reporting data determination systems and dashboard data determination systems, increasing the speed and efficiency of determining and presenting both types of data.

Figure 2:
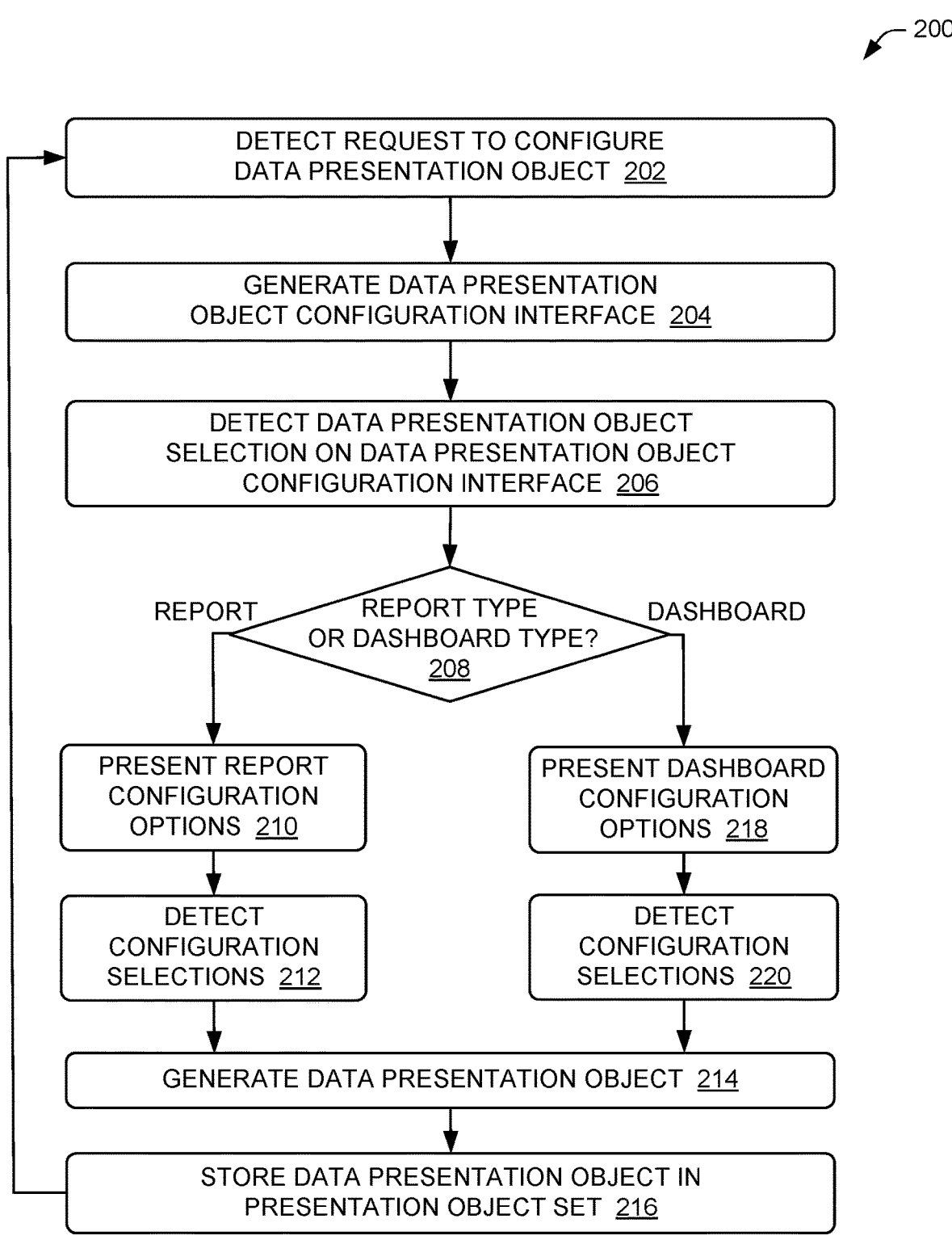
FIG. 2 illustrates a flow diagram of an example method for configuring a data presentation object in a unified data access system.

FIGS. 2-4 are flow diagrams of illustrative processes illustrated as a collection of blocks in a logical flow graph that represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 2 is a flow diagram of an illustrative process 200 to facilitate the configuration of both report data presentation objects and dashboard data presentation object in a unified data access system. The process 200 may be described at times with reference to the environment 100 and may be performed by the unified data access system 110, but the process 200 may also, or instead, be performed in other similar and/or different environments by other similar and/or different systems. In examples, the process 200 may be performed by an "author" user or other user having adequate permissions to access and interact with a data presentation object configuration components of a unified data access system.

At 202, a unified data access system may detect a request to configure a data presentation object. This request may take the form of activating a control on an interface (e.g., a link on a web page or other user-activatable control) that generates a request to generate a data presentation object configuration interface. In examples, this request may be received or otherwise detected at a component such as the data presentation object configuration and publication component 140 of the unified data access system 110 illustrated in FIG. 1.

At 204, the unified data access system may generate and/or present a data presentation object configuration interface (e.g., as a web page or portion thereof presented in a browser or as another type of user interface (e.g., graphic user interface (GUI))) in response to the request detected at 202. This interface may present both the options of configuring a report data presentation object and a dashboard data presentation object. Alternatively or additionally, the data presentation object configuration interface may present one or more other option to configure one or more other types of data presentation objects. These objects may be presented as user-activatable control of any type (e.g., links, drop down menu, buttons, etc.).

At 206, the unified data access system may detect a selection of a particular data presentation object on the data presentation object configuration interface. At 208, the unified data access system may determine a type of data presentation object that was selected at 206. For example, the unified data access system may determine that one of a report data presentation object or a dashboard data presentation object was selected.

If a report data presentation object was determined at 208, the process 200 may proceed to 210 where a report data presentation object configuration interface may be generated and/or presented (e.g., as a web page or portion thereof presented in a browser or as another type of user interface (e.g., GUI)), for example, in the data presentation object configuration interface. This interface may include report data presentation object configuration options. For example, a report data presentation object configuration interface may present one or more static data element configured to collect and/or present data of one or more types for a fixed time frame (e.g., a particular day, week, month, etc.). The report data presentation object configuration interface may also present other report options, such as the time period to be captured in the report, a schedule of report generation, a presentation object set or group with which the report data presentation object is to be associated, etc. The report data presentation object configuration interface may allow a user to select and place multiple data elements in a report data presentation object template, facilitating user configuration and arrangement of such elements, for example as shown in the example user interfaces described below. These selections and other report options selected or otherwise indicated in the report data presentation object configuration interface may be detected at 212. In examples, the configuration of report data presentation objects and/or the generation and presentation of the report data presentation object configuration interface may be facilitated by a component such as the report object configuration component 144 of the data presentation object configuration and publication component 140 of the unified data access system 110 illustrated in FIG. 1.

At 214, the report data presentation object may be generated based on the configurations detected at 212. At 216, the configured report data presentation object may be stored in, or otherwise associated with, a presentation object set. For example, the author user may configure data presentation objects for particular users or users having particular privileges or permissions. The author user may also or instead associate configured data presentation objects with a particular presentation object set, for example, via the data presentation object configuration interface. The process 200 may return to 202 for the configuration of additional data presentation objects.

If a dashboard data presentation object was determined at 208, the process 200 may proceed to 218 where a dashboard data presentation object configuration interface may be generated and/or presented (e.g., as a web page or portion thereof presented in a browser or as another type of user interface (e.g., GUI)), for example, in the data presentation object configuration interface. This interface may include dashboard data presentation object configuration options. For example, a dashboard data presentation object configuration interface may present one or more dynamic data element configured to collect and/or present current or most recent data of one or more types and to update such data over time (e.g., periodically, as available, etc.). The dashboard data presentation object configuration interface may also present other report options, such as a presentation object set or group with which the dashboard data presentation object is to be associated, updating interval, etc. The dashboard data presentation object configuration interface may allow a user to select and place multiple data elements in a dashboard data presentation object template, facilitating user configuration and arrangement of such elements, for example as shown in the example user interfaces described below: These selections and other dashboard options selected or otherwise indicated in the dashboard data presentation object configuration interface may be detected at 220. In examples, the configuration of dashboard data presentation objects and/or the generation and presentation of the dashboard data presentation object configuration interface may be facilitated by a component such as the dashboard object configuration component 142 of the data presentation object configuration and publication component 140 of the unified data access system 110 illustrated in FIG. 1.

Returning to 214, the dashboard data presentation object may be generated based on the configurations detected at 220. At 216, the configured dashboard data presentation object may be stored in, or otherwise associated with, a presentation object set. As noted, the author user may configure data presentation objects for particular users, user privileges, permissions, presentation object sets, etc. The process 200 may return to 202 for the configuration of additional data presentation objects.

FIG. 3 is a flow diagram of an illustrative process 300 to facilitate the publication of both report data presentation objects and dashboard data presentation object in a unified data access system. "Publication" of one or more data presentation object may cause indications of such objects to be presented to users for the user-activatable generation of data presentation interfaces and/or other representations of the data associated with the data presentation objects. The process 300 may be described at times with reference to the environment 100 and may be performed by the unified data access system 110, but the process 300 may also, or instead, be performed in other similar and/or different environments by other similar and/or different systems. In examples, the process 300 may be performed by an "author" user or other user having adequate permissions to access and interact with a data presentation object publication components of a unified data access system. In examples, one or more of the operations performed in process 300 may be performed at a component such as the object publication component 146 of the data presentation object configuration and publication component 140 of the unified data access system 110 illustrated in FIG. 1.

At 302, a unified data access system may detect a request to publish one or more data presentation objects. This request may take the form of activating a control on an interface (e.g., a link on a web page or other user-activatable control) that generates a request to generate a data presentation object publication interface. This request may also, or instead, take the form of selecting a control for publishing a particular data presentation object (e.g., right-click on the object and select "publish").

At 304, the unified data access system may determine a presentation object set. For example, the unified data access system may determine (e.g., all) available data presentation objects for a data processing system, associated with an author user, based on a user selection of a representation object set or associated control, a context, etc. This presentation object set may include both one or more report data presentation objects and one or more dashboard data presentation objects.

At 306, the unified data access system may generate and/or present a data presentation object publication interface (e.g., as a web page or portion thereof presented in a browser or as another type of user interface (e.g., GUI)) in response to the request detected at 302 and/or the determination of the presentation object set at 304. This interface may present both one or more report data presentation objects and one or more dashboard data presentation objects, for example from the presentation object set determined at 304.

At 308, the unified data access system may detect a selection of one or more data presentation objects on the data presentation object publication interface. In examples, the unified data access system may detect a selection of at least one report data presentation object and at least one dashboard data presentation object for publication.

At 310, the unified data access system may associate the selected data presentation objects with a published objects interface and/or otherwise store data indicating that the selected data presentation objects are to be presented to users in an interface that facilitates the generation of data presentation interfaces based on the selected data presentation objects. This interface and/or data associated therewith may be stored at 312.

FIG. 4 is a flow diagram of an illustrative process 300 to facilitate the generation of data presentation interfaces based on both report data presentation objects and dashboard data presentation object in a unified data access system. The process 400 may be described at times with reference to the environment 100 and may be performed by the unified data access system 110, but the process 400 may also, or instead, be performed in other similar and/or different environments by other similar and/or different systems. In examples, the process 400 may be performed by normal user or other user having adequate permissions to request the generation of data presentation interfaces, but, in some examples, insufficient permissions to access and interact with a data presentation object publication or configuration components of a unified data access system. In examples, one or more of the operations performed in process 400 may be performed at a component such as the data presentation interface generation component 160 of the unified data access system 110 illustrated in FIG. 1.

At 402, a unified data access system may detect a request for a published objects interface. This request may take the form of activating a control on an interface (e.g., a link on a web page or other user-activatable control) that generates a request to generate a published objects interface. In examples, this request may be received or otherwise detected at a component such as the published object interface generation component 166 of the data presentation interface generation component 160 of the unified data access system 110 illustrated in FIG. 1.

At 404, the unified data access system may generate and/or present a published objects interface (e.g., as a web page or portion thereof presented in a browser or as another type of user interface (e.g., GUI)) in response to the request detected at 402. Also at 404, the unified data access system may determine the published objects to present in this interface, for example as determine using process 300 of FIG. 3. This interface may present both one or more report data presentation objects and one or more dashboard data presentation objects. Here again, in examples, this interface may be generated and/or presented at a component such as the published object interface generation component 166 of the data presentation interface generation component 160 of the unified data access system 110 illustrated in FIG. 1.

At 406, a selection of one or more of the published data presentation objects represented on the published objects interface may be detected. At 408, the unified data access system may determine a type of data presentation object that was selected at 406. For example, the unified data access system may determine that one of a report data presentation object or a dashboard data presentation object was selected.

If the selected data presentation object is a report data presentation object as determined at 408, the process 400 may proceed to 410 where parameters for the selected report data presentation object may be determined. For example, one or more parameters of one or more static data elements configured at or otherwise associated with the selected report data presentation object may be determined. These parameters may be used to determine the data required to generate and populate a data presentation interface based on the selected report data presentation object.

At 412, this data for populating a report data presentation interface based on the selected report data presentation object may be determined. For example, this data may be retrieved from a data processing system (e.g., the data processing system 120 of FIG. 1).

At 414, the report data presentation interface may be generated based on the selected report data presentation object, its associated parameters determined at 410, and/or the data determined at 412. In examples, the generation and presentation of the report data presentation interface may be facilitated by a component such as the report interface generation component 164 of the data presentation interface generation component 160 of the unified data access system 110 illustrated in FIG. 1. The process 400 may return to 402 for the selection and presentation of additional data presentation interfaces.

If, at 408, the unified data access system determines that the selected data presentation object is a dashboard data presentation object, the process 400 may proceed to 416 where parameters for the selected dashboard data presentation object may be determined. For example, one or more parameters of one or more dynamic data elements configured at or otherwise associated with the selected dashboard data presentation object may be determined. These parameters may be used to determine the data required to generate and populate a data presentation interface based on the selected dashboard data presentation object.

At 418, this data for populating a dashboard data presentation interface based on the selected dashboard data presentation object may be determined. For example, this data may be retrieved from a data processing system (e.g., the data processing system 120 of FIG. 1).

At 414, the dashboard data presentation interface may be generated based on the selected dashboard data presentation object, its associated parameters determined at 416, and/or the data determined at 418. In examples, the generation and presentation of the dashboard data presentation interface may be facilitated by a component such as the dashboard interface generation component 162 of the data presentation interface generation component 160 of the unified data access system 110 illustrated in FIG. 1. The process 400 may return to 402 for the selection and presentation of additional data presentation interfaces.

FIGS. 5A, 5B, 6, and 7 are a representations of exemplary interfaces that may be generated and/or presented by a unified data access system to configure and process data presentation objects and data presentation interfaces as described above. The interfaces illustrated in these figures may be described at times with reference to the environment 100 and the unified data access system 110, but these interfaces and the data represented therein may also, or instead, be generated and/or determined in other similar and/or different environments by other similar and/or different systems.

Figure 5A:
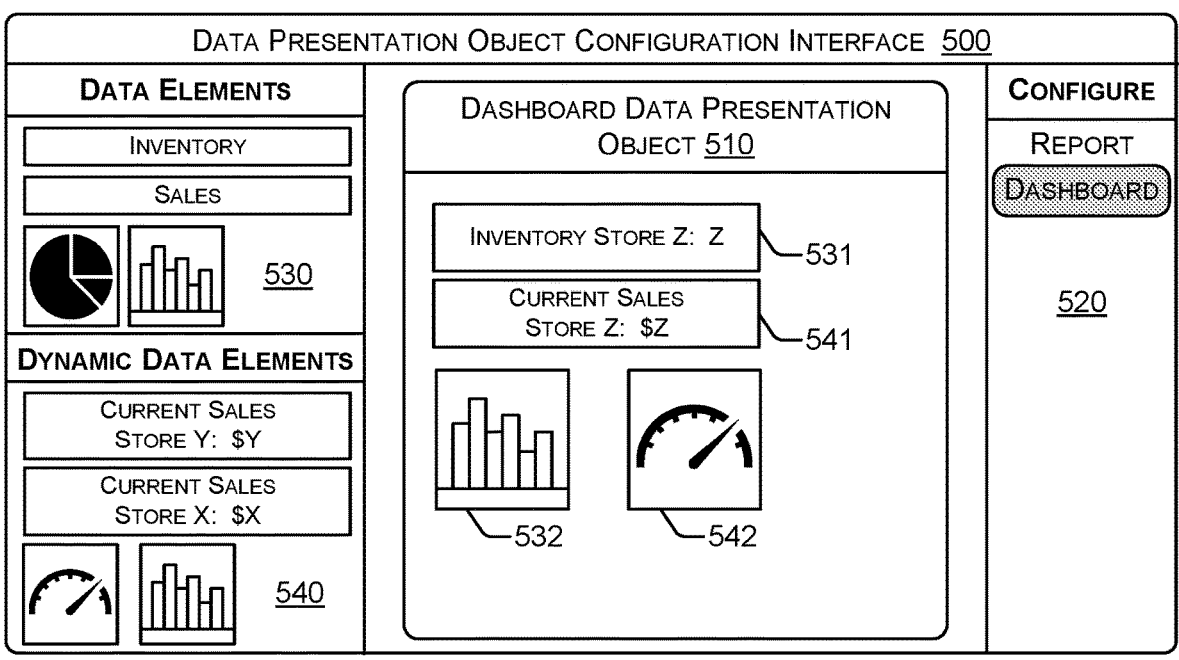
FIG. 5A illustrates a representation of an example data presentation object configuration interface for configuring a dashboard data presentation object in a unified data access system as disclosed herein.

FIG. 5A illustrates an exemplary data presentation object configuration interface 500 that may be presented to a user to facilitate the configuration of a data presentation object. The interface 500 may allow a user to configure both report data presentation objects and dashboard data presentation objects. For example, presentation object type selection section 520 of the interface 500 may include controls that allow a user to select, for configuration, a report data presentation object or a dashboard data presentation object. In this example, the "dashboard" control is highlighted in section 520 indicating that a user has selected this control to configure a dashboard data presentation object. In some examples, access to the interface 500 may be limited to "author" users or others user having the sufficient privileges and/or permissions to access components of a unified data access system that allow for the configuration and/or modification of data presentation objects. In examples, the generation of the data presentation object configuration interface 500 may be facilitated by a component such as the data presentation object configuration and publication component 140 of the unified data access system 110 illustrated in FIG. 1.

In response to the selection of the dashboard configuration control, the interface 500 may display the dashboard data presentation object 510. The dashboard data presentation object 510 may initially be a data presentation object template without any data elements or may be include one or more data elements configured by default. In examples, a variety of templates may be available for a user to select from, each of which may include one or more preconfigured data elements. The user may then adjust the configurations of such data presentation object templates. In examples, the configuration of the dashboard data presentation object 510 and/or the generation and presentation of the dashboard data presentation object configuration interface may be facilitated by a component such as the dashboard object configuration component 142 of the data presentation object configuration and publication component 140 of the unified data access system 110 illustrated in FIG. 1.

In various examples, one or more data elements may be available that are compatible with both report data presentation objects and dashboard presentation objects. There may also, or instead, be one or more data elements available in a unified data access system that are compatible (e.g., only, primarily) with one of report data presentation objects or dashboard presentation objects. For example, the interface 500 may provide indications of the available data elements 530 compatible with either type of data presentation object that a user may select to configure at the dashboard data presentation object 510. Such data objects may be either dynamic or static, or a combination of both. The interface 500 may also, or instead, provide indications of the available dynamic data elements 540 that may be compatible with dashboard data presentation objects that a user may select to configure at the dashboard data presentation object 510. One or more of these dynamic data elements may be active data elements that include controls or other data that are configured to (e.g., automatically and/or without user intervention) update over time to represent current and/or most recent data associated with that element. In this example, the author user may have selected generally available objects 531 and 532 and dynamic objects 541 and 542 from the available data elements 530 and dynamic data elements 540 to include in the dashboard data presentation object 510. The interface 500 may further allow the author user to arrange and/or format these data elements and/or modify parameters and/or other data associated with such elements via interaction with the interface 500.

Figure 5B:
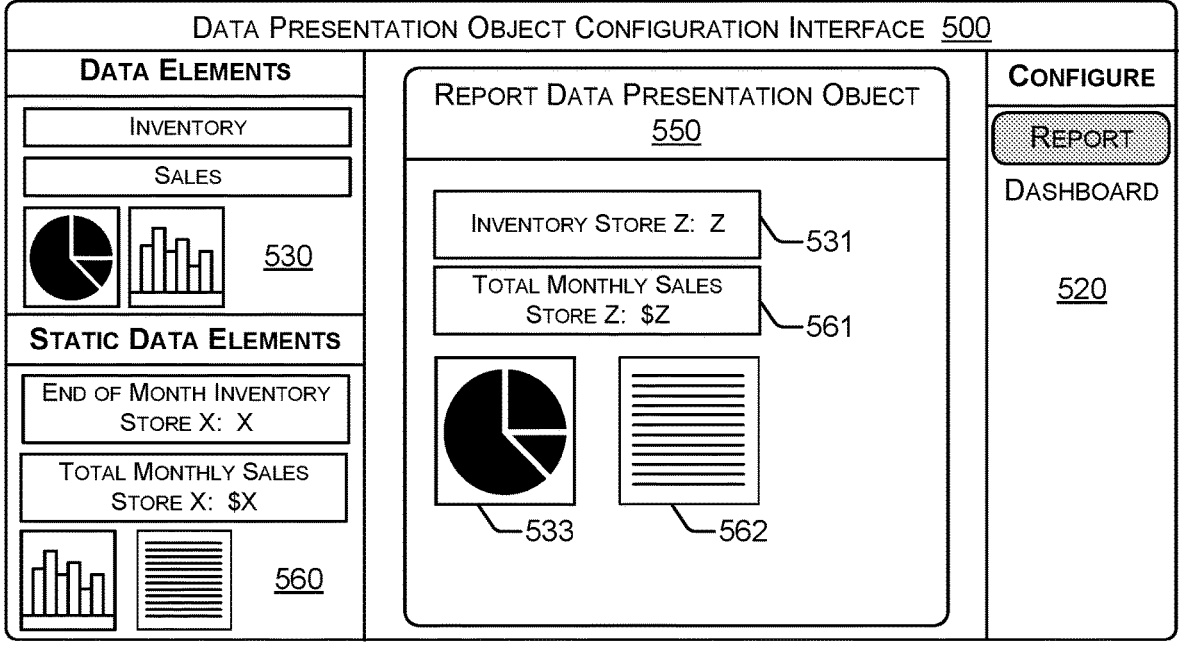
FIG. 5B illustrates a representation of the example data presentation object configuration interface of 5A for configuring a report data presentation object in a unified data access system as disclosed herein.

As described herein, a unified data access system facilitates the configuration and processing of both report data presentation objects and dashboard presentation objects. In various examples, the configuration of either or both types of data presentation objects may be performed using a same interface. For example, the interface 500 of FIG. 5A, described in regard to that figure as facilitating the configuration of a dashboard data presentation object, may also be used to configure a report data presentation object. Referring now to FIG. 5B, the exemplary data presentation object configuration interface 500 in this example may again be presented to a user to facilitate the configuration of a data presentation object. As noted, the interface 500 may allow a user to configure both report data presentation objects and dashboard data presentation objects. In this example, the presentation object type selection section 520 of the interface 500, that may include controls that allow a user to select a report data presentation object or a dashboard data presentation object for configuration, indicates that the "report" control has been selected (e.g., this control is highlighted). Therefore, the interface 500 may be configured allow a user (e.g., author user) to configure a report data presentation object. Here again, access to the interface 500 may be limited to "author" users or others user having the sufficient privileges and/or permissions to access components of a unified data access system that allow for the configuration and/or modification of data presentation objects. In examples, the generation of the data presentation object configuration interface 500 may be facilitated by a component such as the data presentation object configuration and publication component 140 of the unified data access system 110 illustrated in FIG. 1.

In response to the selection of the report configuration control, the interface 500 may display the report data presentation object 550. As with dashboard data presentation objects, the report data presentation object 550 may initially be a data presentation object template without any data elements or may be include one or more data elements configured by default. In examples, a variety of templates may be available for a user to select from, each of which may include one or more preconfigured data elements. The user may then adjust the configurations of such data presentation object templates. In examples, the configuration of the report data presentation object 550 and/or the generation and presentation of the report data presentation object configuration interface may be facilitated by a component such as the report object configuration component 144 of the data presentation object configuration and publication component 140 of the unified data access system 110 illustrated in FIG. 1.

As noted, in a unified data access system, one or more data elements may be available that are compatible with both report data presentation objects and dashboard presentation objects and one or more data elements may be compatible (e.g., only, primarily) with one of report data presentation objects or dashboard presentation objects. For example, the interface 500 may include the data elements 530 that may be the same generally available data elements 630 presented in the example of FIG. 5A. In this example, the interface 500 may also provide indications of the available static data elements 560 that may be compatible with report data presentation objects and that a user may select to configure at the report data presentation object 550. One or more of these static data elements may be data elements that include controls or other data that are configured to (e.g., automatically and/or without user intervention) retrieve or otherwise access data for a single time period or point in time (e.g., as opposed to dynamic data elements that update over time). In this example, the author user may have selected generally available objects 531 and 533 and static objects 561 and 562 from the available static data elements 560 to include in the report data presentation object 550. The interface 500 may further allow the author user to arrange and/or format these data elements and/or modify parameters and/or other data associated with such elements via interaction with the interface 500.

Figure 6:
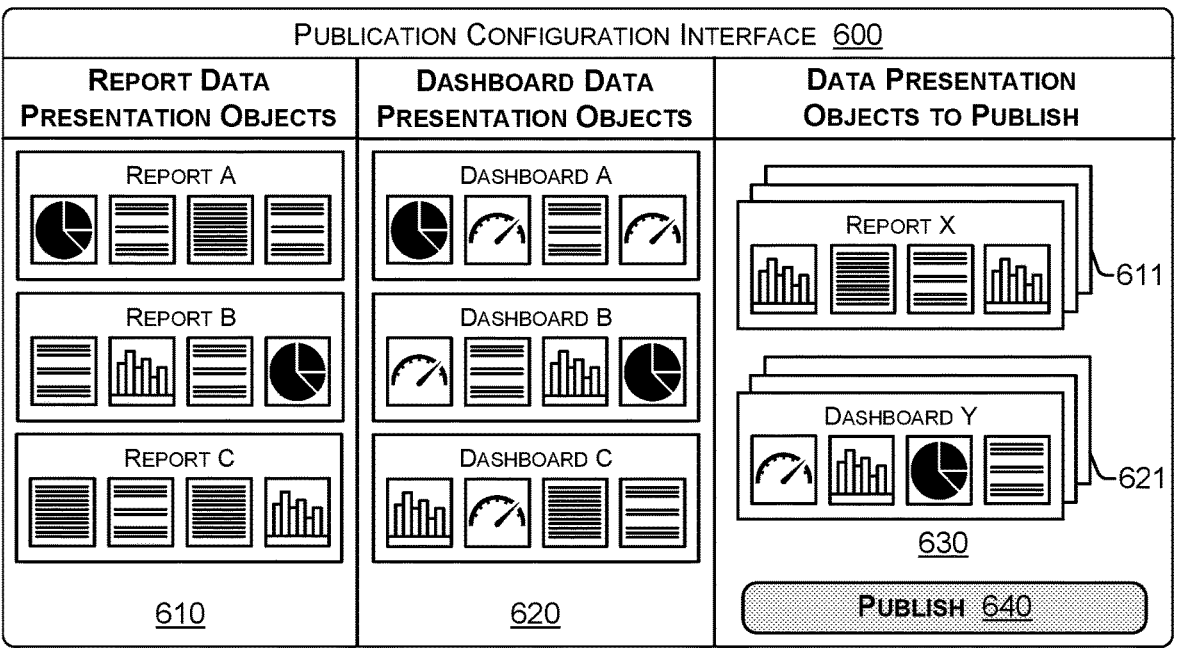
FIG. 6 illustrates a representation of an example object publication configuration interface for publishing presentation objects in a unified data access system as disclosed herein.

A unified data access system as described herein may facilitate the processing of both report data presentation objects and dashboard presentation objects, for example in a single interface or environment. In various examples, both types of data presentation objects may be published for user access. FIG. 6 illustrates an exemplary publication configuration interface 600 that may be presented to a user to facilitate the publication of multiple types of data presentation objects. The interface 600 may allow a user to publish both report data presentation objects and dashboard data presentation objects in a publication set of data presentation objects for use in a data presentation interface. For example, the interface 600 of FIG. 6 may allow a user to configure both one or more report data presentation objects from report data presentation objects 610 and one or more dashboard data presentation objects from dashboard data presentation objects 620 as data presentation objects to be published. Here again, access to the interface 600 may be limited to "author" users or others user having the sufficient privileges and/or permissions to access components of a unified data access system that allow for the publication of data presentation objects. In examples, the generation of the publication configuration interface 600 may be facilitated by a component such as the object publication component 146 of the data presentation object configuration and publication component 140 of the unified data access system 110 illustrated in FIG. 1.

In this example, the author user may have selected one or more report data presentation objects 611 and one or more dashboard data presentation objects 621 to be included in the data presentation objects to publish 630. The user may add or remove data presentation objects from the objects 610 and/620 as desired. To publish the set of selected data presentation objects to publish 630, the control 640 may be activated by the user. In response to this activation, the data objects in the set of objects 630 may be made available to authorized users for use in generating data presentation interfaces.

Figure 7:
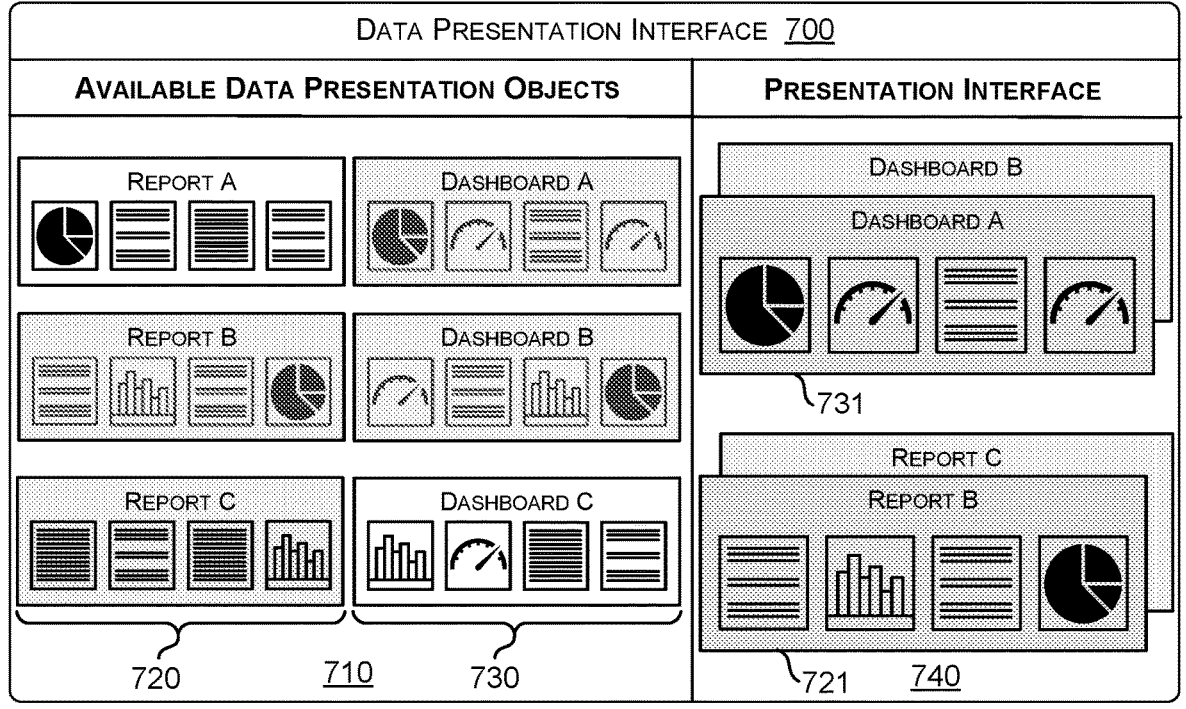
FIG. 7 illustrates a representation of an example published objects interface for presenting a set of one or more presentation objects for user selection in a unified data access system as disclosed herein.

FIG. 7 illustrates an exemplary data presentation interface 700 that may be presented to a user to facilitate the presentation of data based on data presentation objects. The interface 700 may allow a user to select either or both report data presentation objects and dashboard data presentation objects from a (e.g., single) set of published data presentation objects. In examples, the generation of the data presentation interface 700 may be facilitated by a component such as the published object interface generation component 166 of the data presentation interface generation component 160 of the unified data access system 110 illustrated in FIG. 1.

In this example, the interface 700 of FIG. 7 may allow a user to select one or more data presentation objects from the set of available data presentation objects 710. As shown in this example, the set of available data presentation objects 710 may include one or more report data presentation objects 720 and one or more dashboard data presentation objects 730. A user may have selected or otherwise activated one or more dashboard data presentation objects corresponding to the dashboard data presentation interfaces 731 from the objects 710, and specifically from the dashboard data presentation objects 730 (e.g., the highlighted dashboard data presentation object in section 710). Similarly, a user may have selected or otherwise activated one or more report data presentation objects corresponding to the report data presentation interfaces 721 from the objects 710, and specifically from the report data presentation objects 720 (e.g., the highlighted report data presentation object in section 710).

In response to these activations, the selected data objects may be processed to generate the interfaces 731 and 721 presented (e.g., simultaneously) in presentation interface section 740 of the interface 700. For example, the data elements in the associated data presentation objects may be processed and/or otherwise used to obtain the data presented in the interfaces 731 and 721. In examples, the generation of the dashboard data presentation interface 731 may be facilitated by a component such as the dashboard interface generation component 162 of the data presentation interface generation component 160 of the unified data access system 110 illustrated in FIG. 1. Similarly, the generation of the report data presentation interface 721 may be facilitated by a component such as the report interface generation component 164 of the data presentation interface generation component 160 of the unified data access system 110 illustrated in FIG. 1.

Figure 8:
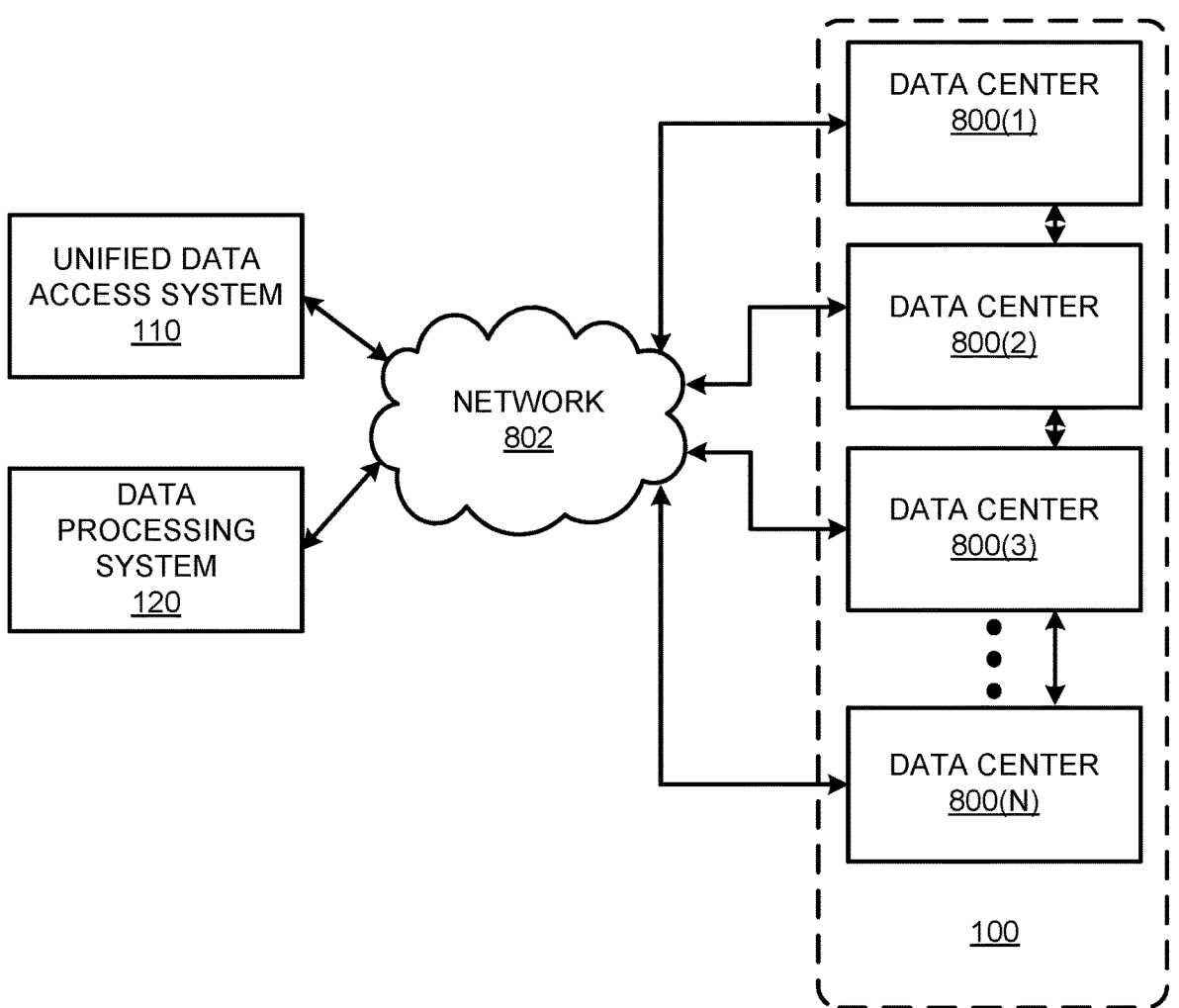
FIG. 8 is a system and network diagram that shows an illustrative operating environment that includes a system that can be configured to implement aspects of the functionality described herein.

FIG. 8 is a system and network diagram that shows an illustrative operating environment that includes a unified data access system 110 and a data processing system 120 that can be configured to implement aspects of the functionality described herein. The systems 110 and 120 can each execute and/or implement various types of computing and network services, such as the data storage and data processing, and/or utilize various computing resources of various types of systems on a permanent or an as-needed basis. Among other types of functionality, the computing resources utilized and/or implemented by the systems 110 and 120, or by a larger system of which one or more of these systems may be a part, can be utilized to implement the various unified data access operations described herein. One or more of the systems 110 and 120 may be part of a larger system that provides additional computing resources that include, without limitation, data storage resources, data processing resources, such as virtual machine (VM) instances, networking resources, data communication resources, network services, and other types of resources.

Each type of computing resource utilized and/or implemented at the systems 110 and 120 or by a larger system of which one or more of these systems may be a part, can be general-purpose or can be available in a number of specific configurations. For example, data processing resources can be implemented as physical computers or VM instances in a number of different configurations. The VM instances can be configured to execute applications, including web servers, application servers, media servers, database servers, some or all of the unified data access operations described above, and/or other types of programs. Data storage resources can include file storage devices, block storage devices, and the like. The systems 110 and 120, or a larger system of which one or more of these systems may be a part, can also be configured to perform other types of operations and/or utilize and/or implement other computing resources not mentioned specifically herein.

The computing resources utilized and/or implement by systems 110 and 120, or a larger system of which one or more of these systems may be a part, may be enabled in one implementation by one or more data centers 800(1), 800(2), 800(3) . . . 800(N) that may be configured in (partially or wholly) and/or communicative connected to the environment 100. The data centers are facilities utilized to house and operate computer systems and associated components. The data centers typically include redundant and backup power, communications, cooling, and security systems. The data centers can also be located in geographically disparate locations. One illustrative configuration for a data center that can be utilized to implement the technologies disclosed herein will be described below with regard to FIG. 9.

The users of the system can access the computing resources, such as systems 110 and 120, and/or any of the computing resources in the environment 100, provided by the system over a network 802, which can be a wide area communication network ("WAN"), such as the Internet, an intranet, an Internet service provider ("ISP") network, or a combination of such networks. For example, and without limitation, a computing device (e.g., the unified data access system 110) operated by a user of the system can be utilized to access the system by way of the network 802. It should be appreciated that a local-area network ("LAN"), the Internet, or any other networking topology known in the art that connects the data centers to remote users and other users can be utilized. It should also be appreciated that combinations of such networks can also be utilized.

Figure 9:
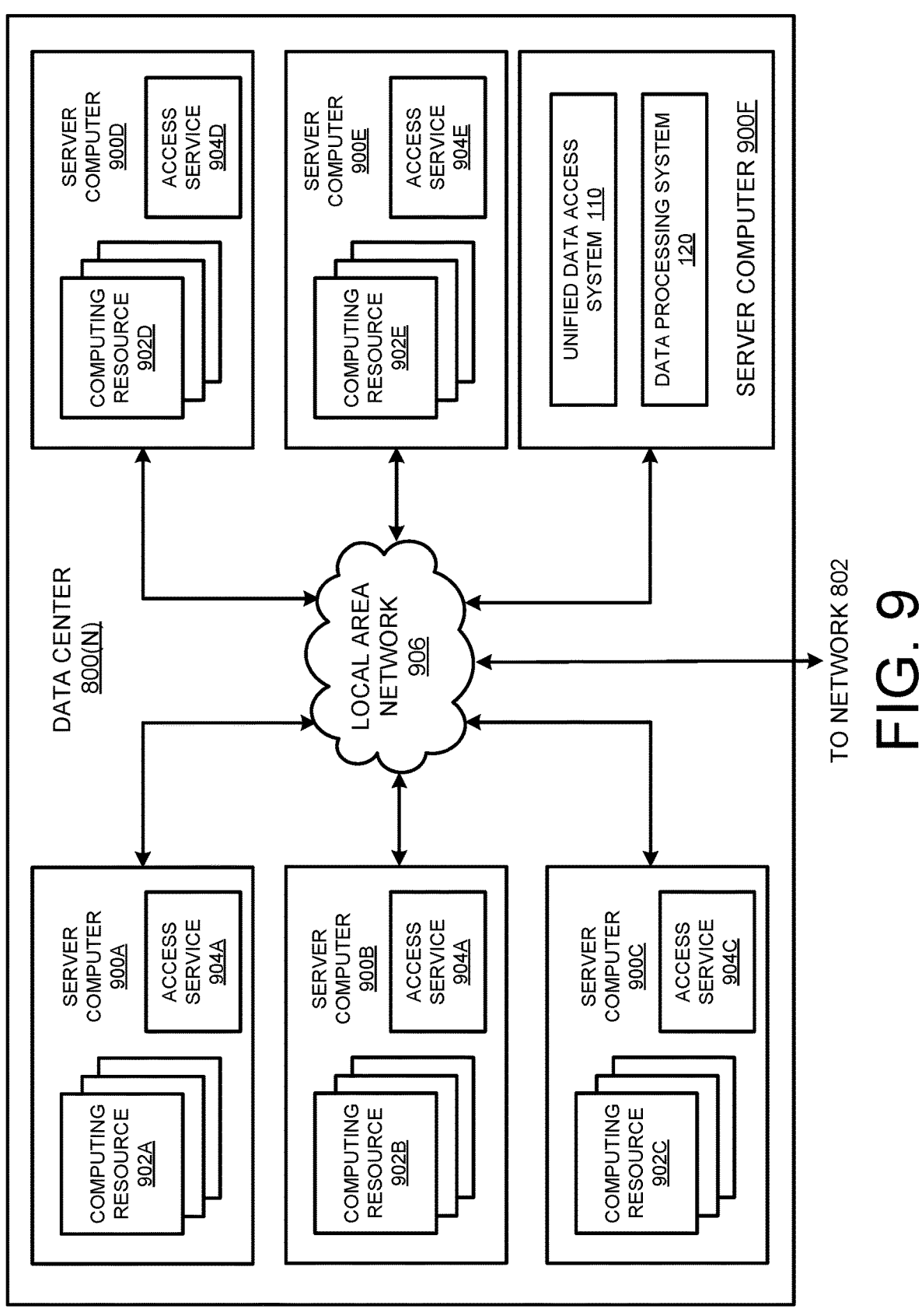
FIG. 9 is a computing system diagram illustrating a configuration for a data center that can be utilized to implement aspects of the technologies disclosed herein.

FIG. 9 is a computing system diagram that illustrates one configuration for a data center 800(N) that can be utilized to implement the systems 110 and 120, as described above in FIGS. 1-7 and/or any other unified data access system disclosed herein. The example data center 800(N) shown in FIG. 9 includes several server computers 900A-900E (collectively 900) for providing the computing resources 902A-902E (collectively 902), respectively.

The server computers 900 can be standard tower, rackmount, or blade server computers configured appropriately for providing the various computing resources described herein (illustrated in FIG. 9 as the computing resources 902A-902E). As mentioned above, the computing resources 902 may be utilized and/or configured at one or more of systems 110 and 120, or a larger system of which these systems may be a part, and can include, without limitation, analytics applications, data storage resources, data processing resources such as VM instances or hardware computing systems, database resources, networking resources, model execution resources, model training resources, and others. Some of the servers 900 can also be configured to execute access services 904A-904E (collectively 904) capable of instantiating, providing and/or managing the computing resources 902, some of which are described in detail herein.

The data center 800(N) shown in FIG. 9 also includes a server computer 900F that can execute some or all of the software components described above. For example, and without limitation, the server computer 900F can be configured to execute one or more of the systems 110 and 120 and/or one or more components associated therewith. The server computer 900F can also be configured to execute other components and/or to store data for providing some or all of the functionality described herein. In this regard, it should be appreciated that components or different instances of one or more of the systems 110 and 120 can execute on many other physical or virtual servers in the data centers 800 in various configurations.

In the example data center 800(N) shown in FIG. 9, an appropriate LAN 906 is also utilized to interconnect the server computers 900A-900F. The LAN 906 is also connected to the network 902 illustrated in FIG. 9. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 800(1)-(N), between each of the server computers 900A-900F in each data center 800, and, potentially, between computing resources 902 in each of the data centers 800. It should be appreciated that the configuration of the data center 800 described with reference to FIG. 8 is merely illustrative and that other implementations can be utilized.

Figure 10:
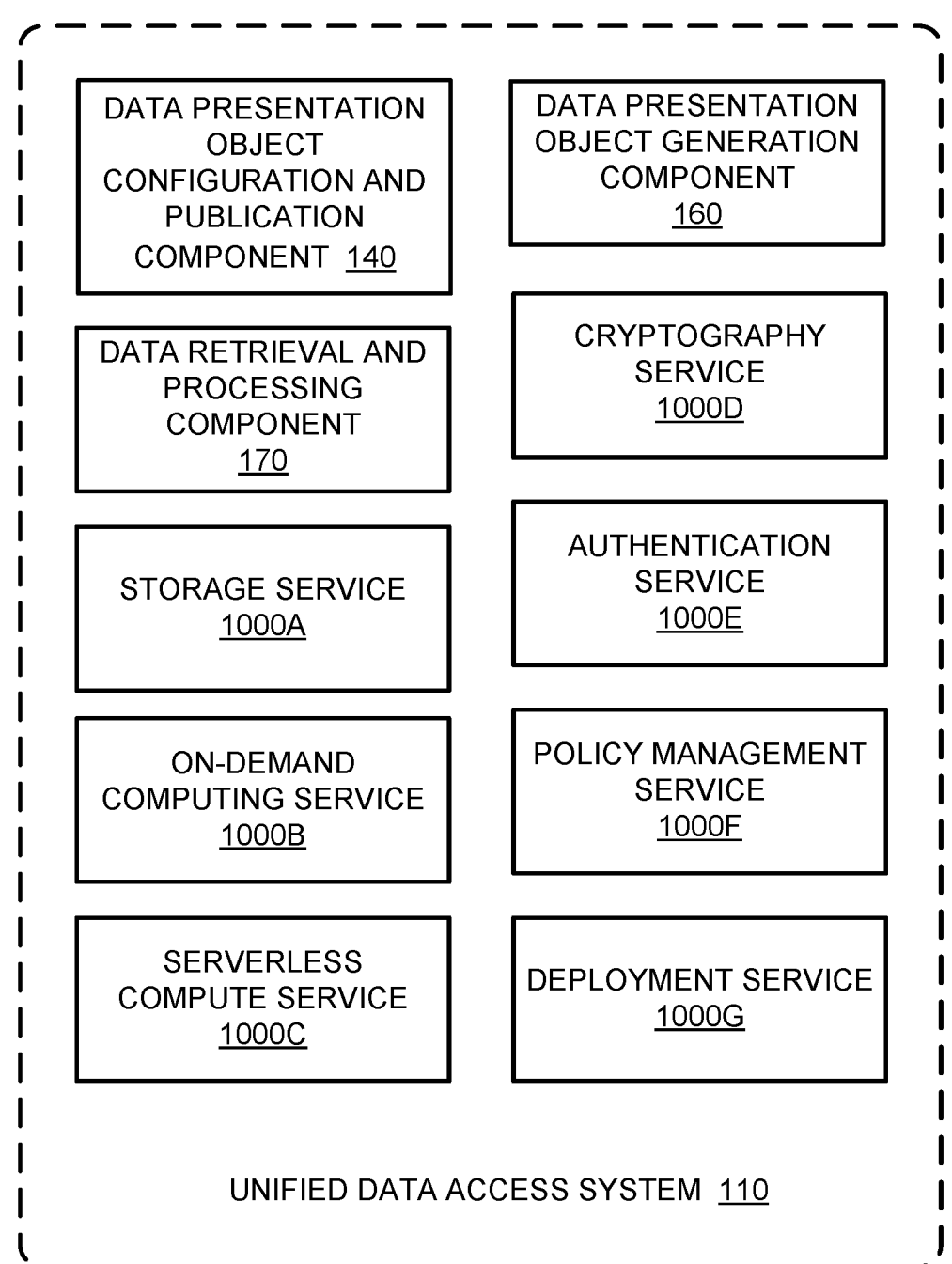
FIG. 10 is a network services diagram that shows aspects of several services that can be provided by and utilized within a system, or a larger system of which the system is a part, which is configured to implement the various technologies disclosed herein.

FIG. 10 is a system services diagram that shows aspects of several services that can be provided by and utilized within the systems 110 and 120 and/or a larger system of which these systems may be a part, which is configured to implement the various technologies disclosed herein. In particular, and as discussed above, these systems, or a larger system of which these systems may be a part, can provide a variety of services to users and other users including, but not limited to, unified data access services performed by data presentation object configuration and publication component 140, data presentation interface generation component 160, data retrieval and processing component 170, and/or one or more computing instances performing one or more functions thereof: a storage service 1000A: an on-demand computing service 1000B: a serverless compute service 1000C: a cryptography service 1000D; an authentication service 1000E: a policy management service 1000F; and a deployment service 1000G. The system, or a larger system of which the system is a part, can also provide other types of computing services, some of which are described below.

It is also noted that not all configurations described include the services shown in FIG. 10 and that additional services can be provided in addition to, or as an alternative to, the services explicitly described herein. Each of the systems and services shown in FIG. 10 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 10 will now be provided.

The storage service 1000A can be a network-based storage service that stores data obtained from users of the system and/or from computing resources in the system, or a larger system of which the system is a part. The data stored by the storage service 1000A can be obtained from computing devices of users. The data stored by the storage service 1000A may also be activity data logged to the storage system 1000A that may be functioning as a logging system or service.

The on-demand computing service 1000B can be a collection of computing resources configured to instantiate VM instances and to provide other types of computing resources on demand. For example, a user of the system, or a larger system of which the system is a part, can interact with the on-demand computing service 1000B (via appropriately configured and authenticated API calls, for example) to provision and operate VM instances that are instantiated on physical computing devices hosted and operated by the system, or a larger system of which the system is a part. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 1000B is shown in FIG. 10, any other computer system or computer system service can be utilized in the system, or a larger system of which the system is a part, to implement the functionality disclosed herein, such as a computer system or computer system service that does not employ virtualization and instead provisions computing resources on dedicated or shared computers/servers and/or other physical devices.

The serverless compute service 1000C is a network service that allows users to execute code (which might be referred to herein as a "function") without provisioning or managing server computers in the system, or a larger system of which the system is a part. Rather, the serverless compute service 1000C can automatically run code in response to the occurrence of events. The code that is executed can be stored by the storage service 1000A or in another network accessible location.

In this regard, it is to be appreciated that the term "serverless compute service" as used herein is not intended to infer that servers are not utilized to execute the program code, but rather that the serverless compute service 1000C enables code to be executed without requiring a user to provision or manage server computers. The serverless compute service 1000C executes program code only when needed, and only utilizes the resources necessary to execute the code. In some configurations, the user or entity requesting execution of the code might be charged only for the amount of time required for each execution of their program code.

The system, or a larger system of which the system is a part, can also include a cryptography service 1000D. The cryptography service 1000D can utilize storage services of the system, or a larger system of which the system is a part, such as the storage service 1000A, to store encryption keys in encrypted form, whereby the keys can be usable to decrypt user keys accessible only to particular devices of the cryptography service 1000D. The cryptography service 1000D can also provide other types of functionality not specifically mentioned herein.

The system, or a larger system of which the system is a part, in various configurations, also includes an authentication service 1000E and a policy management service 1000F. The authentication service 1000E, in one example, is a computer system (i.e., collection of computing resources 1000B) configured to perform operations involved in authentication of users or customers. For instance, one of the services shown in FIG. 10 can provide information from a user or customer to the authentication service 1000E to receive information in return that indicates whether or not the requests submitted by the user or the customer are authentic.

The policy management service 1000F, in one example, is a network service configured to manage policies on behalf of users or customers of the system, or a larger system of which the system is a part. The policy management service 1000F can include an interface (e.g., API or GUI) that enables customers to submit requests related to the management of policy, such as a security policy. Such requests can, for instance, be requests to add, delete, change, or otherwise modify policy for a customer, service, or system, or for other administrative actions, such as providing an inventory of existing policies and the like.

The system, or a larger system of which the system is a part, can additionally maintain other network services based, at least in part, on the needs of its customers. For instance, the system, or a larger system of which the system is a part, can maintain a deployment service 1000G for deploying program code in some configurations. The deployment service 1000G provides functionality for deploying program code, such as to virtual or physical hosts provided by the on-demand computing service 1000B. Other services include, but are not limited to, database services, object-level archival data storage services, and services that manage, monitor, interact with, or support other services. The system, or a larger system of which the system is a part, can also be configured with other network services not specifically mentioned herein in other configurations.

Figure 11:
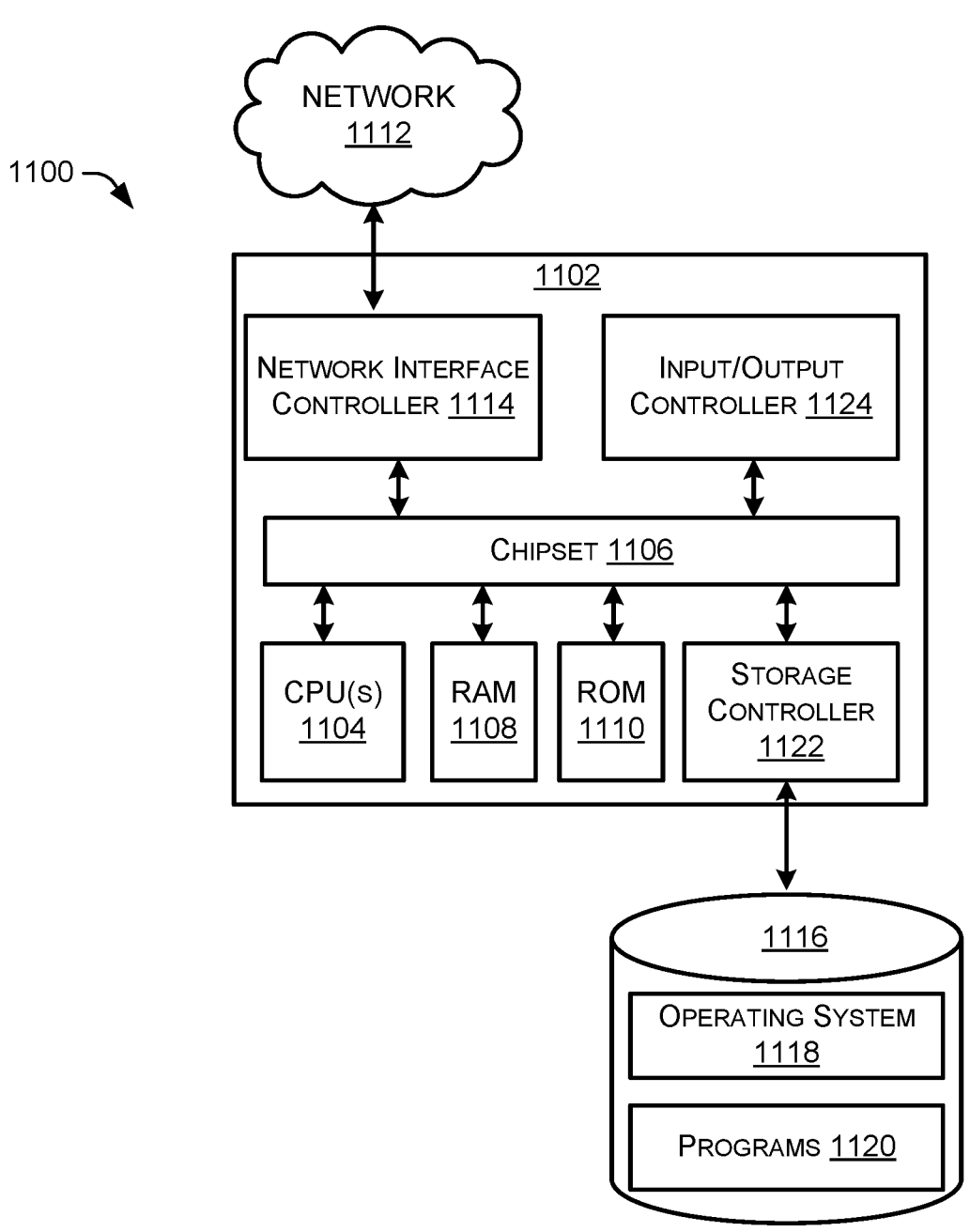
FIG. 11 is a computer architecture diagram showing an illustrative computer hardware architecture for implementing a computing device that can be utilized to implement aspects of the various technologies presented herein.

FIG. 11 shows an example computer architecture for a computer 1100 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein. The computer 1100 may represent architecture for a unified data access system, a data processing system, and/or other systems and components described herein.

The computer 1100 includes a baseboard 1102, or "motherboard," which may be one or more printed circuit boards to which a multitude of components and/or devices may be connected by way of a system bus and/or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as the network 1112. The chipset 1106 can include functionality for providing network connectivity through a NIC 1114, such as a gigabit Ethernet adapter. The NIC 1114 is capable of connecting the computer 1100 to other computing devices over the network 1112. It should be appreciated that multiple NICs 1114 can be present in the computer 1100, connecting the computer to other types of networks and remote computer systems.

The computer 1100 can be connected to a mass storage device 1116 that provides non-volatile storage for the computer. The mass storage device 1116 can store an operating system 1118, programs 1120, and data, which have been described in greater detail herein. The mass storage device 1116 can be connected to the computer 1100 through a storage controller 1122 connected to the chipset 1106. The mass storage device 1116 can consist of one or more physical storage units. The storage controller 1122 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 can store data on the mass storage device 1116 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1116 is characterized as primary or secondary storage, and the like.

For example, the computer 1100 can store information to the mass storage device 1116 by issuing instructions through the storage controller 1122 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the mass storage device 1116 by detecting the physical states or characteristics of one or more particular locations within the physical storage units.

In addition to the mass storage device 1116 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned above, the mass storage device 1116 can store an operating system 1118 utilized to control the operation of the computer 1100. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1116 can store other system or application programs and data utilized by the computer 1100.

In one configuration, the mass storage device 1116 or other computer-readable storage media is encoded with computer-executable instructions which, when loaded into the computer 1100, transform the computer from a general-purpose computing system into a special-purpose computer capable of implementing the configurations described herein. These computer-executable instructions transform the computer 1100 by specifying how the CPUs 1104 transition between states, as described above. According to one configuration, the computer 1100 has access to computer-readable storage media storing computer-executable instructions which, when executed by the computer 1100, perform the various processes described above. The computer 1100 can also include computer-readable storage media for performing any of the other computer-implemented operations described herein.

The computer 1100 can also include one or more input/output controllers 1124 for receiving and processing input from a number of input devices, such as a keyboard, a mouse, a touchpad, a touch screen, an electronic stylus, or other type of input device. Similarly, an input/output controller 1124 can provide output to a display, such as a computer monitor, a flat-panel display, a digital projector, a printer, or other type of output device. It will be appreciated that the computer 1100 might not include all of the components shown in FIG. 11, can include other components that are not explicitly shown in FIG. 11, or can utilize an architecture completely different than that shown in FIG. 11.

Based on the foregoing, it should be appreciated that technologies for providing unified data access systems for generating and processing report data presentation objects and dashboard data presentation objects have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A method comprising:

generating, at a unified data access system, a data presentation interface comprising a first indication of a report data presentation object and a second indication of a dashboard data presentation object, the report data presentation object comprising one or more static data elements and the dashboard data presentation object comprising one or more dynamic data elements;

detecting, at the unified data access system via the data presentation interface, a first activation of the report data presentation object and a second activation of the dashboard data presentation object;

based on the first activation of the report data presentation object:

retrieving report data associated with a historical time period from a data processing system based on the one or more static data elements; and generating a report data presentation interface based on the report data and the report data presentation object;

based on the second activation of the dashboard data presentation object:

retrieving dashboard data associated with a first time period from the data processing system based on the one or more dynamic data elements; and generating a dashboard data presentation interface based on the dashboard data and the dashboard data presentation object;

simultaneously presenting, after the first time period, both the report data presentation interface and the dashboard data presentation interface within the data presentation interface;

configuring, at the unified data access system via the data presentation interface, the report data presentation object with a shared data element;

configuring, at the unified data access system via the data presentation interface, the dashboard data presentation object with the shared data element, wherein the shared data element is a data element configured to be present in both the dashboard data presentation object and the report data presentation object;

updating, at the unified data access system via the data presentation interface, a value associated with the shared data element; and automatically, after a second time period following the first time period:

retrieving updated dashboard data associated with the second time period from the data processing system based on the one or more dynamic data elements;

generating an updated dashboard data presentation interface based on the updated dashboard data and the dashboard data presentation object; and simultaneously presenting both the report data presentation interface and the updated dashboard data presentation interface within the data presentation interface, wherein the shared data element displays the updated value on both the report data presentation interface and the updated dashboard data presentation interface.

2. The method of claim 1, further comprising:

generating, at the unified data access system, a data presentation object configuration interface comprising a report data presentation object configuration control and a dashboard data presentation object configuration control;

detecting, at the unified data access system via the data presentation object configuration interface, a third activation of the report data presentation object configuration control and fourth activation of the dashboard data presentation object configuration control;

based on the third activation of the report data presentation object configuration control:

generating a report data presentation object configuration interface; detecting report data presentation object configuration data via the report data presentation object configuration interface; and generating the report data presentation object based on the report data presentation object configuration data; and based on the fourth activation of the dashboard data presentation object configuration control:

generating a dashboard data presentation object configuration interface;

detecting dashboard data presentation object configuration data via the dashboard data presentation object configuration interface; and generating the dashboard data presentation object based on the dashboard data presentation object configuration data.

3. The method of claim 1, further comprising:

generating, at the unified data access system, a data presentation object publication interface comprising the first indication of the report data presentation object and the second indication of the dashboard data presentation object;

detecting, at the unified data access system via the data presentation object publication interface, a first selection of the first indication of the report data presentation object and a second selection of the second indication of the dashboard data presentation object;

based on the first selection of the first indication of the report data presentation object, associating the report data presentation object with the data presentation interface; and based on the second selection of the second indication of the dashboard data presentation object, associating the dashboard data presentation object with the data presentation interface.

4. A method comprising:

detecting, at a unified data access system, a first activation of a report data presentation object and a second activation of a dashboard data presentation object at a data presentation interface;

generating, at the unified data access system, a report data presentation interface comprising a static data element and based at least in part on report data retrieved from a data processing system based at least in part on the report data presentation object;

generating, at the unified data access system, a dashboard data presentation interface comprising a dynamic data element and based at least in part on dashboard data associated with a first time period and retrieved from the data processing system based at least in part on the dashboard data presentation object;

simultaneously presenting, after the first time period, both the report data presentation interface and the dashboard data presentation interface within the data presentation interface;

configuring, at the unified data access system via the data presentation interface, the report data presentation object with a shared data element;

configuring, at the unified data access system via the data presentation interface, the dashboard data presentation object with the shared data element, wherein the shared data element is a data element configured to be present in both the dashboard data presentation object and the report data presentation object;

updating, at the unified data access system via the data presentation interface, a value associated with the shared data element; and automatically, after a second time period following the first time period:

generating, at the unified data access system, an updated dashboard data presentation interface comprising an updated dynamic data element and based at least in part on updated dashboard data associated with the second time period retrieved from the data processing system based at least in part on the dashboard data presentation object; and simultaneously presenting both the report data presentation interface and the updated dashboard data presentation interface within the data presentation interface, wherein the shared data element displays the updated value on both the report data presentation interface and the updated dashboard data presentation interface.

5. The method of claim 4, further comprising:

receiving, at the unified data access system via a data presentation object configuration interface, report data presentation object configuration data and dashboard data presentation object configuration data; and generating, at the unified data access system, the report data presentation object based at least in part on the report data presentation object configuration data;

generating, at the unified data access system, the dashboard data presentation object based at least in part on the dashboard data presentation object configuration data; and associating, at the unified data access system, the report data presentation object and the dashboard data presentation object with the data presentation interface.

6. The method of claim 5, wherein the report data presentation object configuration data comprises an indication of a selection of the static data element from among a plurality of static data elements.

7. The method of claim 5, wherein the dashboard data presentation object configuration data comprises an indication of a selection of the dynamic data element from among a plurality of dynamic data elements.

8. The method of claim 4, wherein generating the dashboard data presentation interface comprises periodically updating the dashboard data presentation interface based at least in part on the dynamic data element.

9. The method of claim 8, wherein periodically updating the dashboard data presentation interface comprises periodically retrieving data from the data processing system based at least in part on the dynamic data element.

10. The method of claim 4, wherein generating the report data presentation interface comprises configuring a control associated with a second dynamic data element on the report data presentation interface.

11. The method of claim 10, wherein generating the report data presentation interface comprises periodically updating the report data presentation interface based at least in part on the second dynamic data element.

12. The method of claim 4, further comprising generating the data presentation interface to simultaneously display a first indication of the report data presentation object and a second indication of the dashboard data presentation object.

13. The method of claim 4, wherein the report data presentation interface comprises a data element associated with modifying the presentation of the report data in the report data presentation interface.

14. A system comprising:

one or more processors; and one or more computer-readable media storing computer-executable instructions that, when executed by the one or more processors, cause a unified data access system to perform operations comprising:

detecting, at the unified data access system, a first activation of a report data presentation object at a data presentation interface;

generating, at the unified data access system and based at least in part on the first activation of the report data presentation object, a report data presentation interface comprising a static data element and based at least in part on report data accessed at a data processing system based at least in part on the report data presentation object;

detecting, at the unified data access system, a second activation of a dashboard data presentation object at the data presentation interface;

generating, at the unified data access system and based at least in part on the second activation of the dashboard data presentation object, a dashboard data presentation interface comprising a dynamic data element and based at least in part on dashboard data associated with a first time period and accessed at the data processing system based at least in part on the dashboard data presentation object;

simultaneously presenting, after the first time period, both the report data presentation interface and the dashboard data presentation interface within the data presentation interface;

configuring, at the unified data access system via the data presentation interface, the report data presentation object with a shared data element;

configuring, at the unified data access system via the data presentation interface, the dashboard data presentation object with the shared data element, wherein the shared data element is a data element configured to be present in both the dashboard presentation object and the report data presentation object;

updating, at the unified data access system via the data presentation interface, a value associated with the shared data element; and automatically, after a second time period following the first time period:

generating, at the unified data access system, an updated dashboard data presentation interface comprising an updated dynamic data element and based at least in part on updated dashboard data associated with the second time period retrieved from the data processing system based at least in part on the dashboard data presentation object; and simultaneously presenting both the report data presentation interface and the updated dashboard data presentation interface within the data presentation interface, wherein the shared data element displays the updated value on both the report data presentation interface and the updated dashboard data presentation interface.

15. The system of claim 14, wherein generating the report data presentation interface comprises configuring a control associated with a second dynamic data element on the report data presentation interface.

16. The system of claim 14, wherein generating the dashboard data presentation interface comprises periodically updating the dashboard data presentation interface based at least in part on the dynamic data element.

17. The system of claim 14, wherein the operations further comprise:

receiving, at the unified data access system via a data presentation object configuration interface, report data presentation object configuration data and dashboard data presentation object configuration data, the report data presentation object configuration data comprising a data element;

generating, at the unified data access system, the report data presentation object comprising the data element based at least in part on the report data presentation object configuration data; and generating, at the unified data access system, the dashboard data presentation object comprising the data element based at least in part on the dashboard data presentation object configuration data.

18. The system of claim 14, wherein the operations further comprise:

detecting a first selection of a first indication of the report data presentation object at a data presentation object publication interface;

based at least in part on the first selection of the first indication of the report data presentation object, associating the report data presentation object with the data presentation interface;

detecting a second selection of a second indication of the dashboard data presentation object at the data presentation object publication interface; and based at least in part on the second selection of the second indication of the dashboard data presentation object, associating the dashboard data presentation object with the data presentation interface.

19. The system of claim 18, wherein the operations further comprise:

determining that the report data presentation object and the dashboard data presentation object are associated with the data presentation interface; and generating the data presentation interface comprising the report data presentation object and the dashboard data presentation object based at least in part on determining that the report data presentation object and the dashboard data presentation object are associated with the data presentation interface.

20. The system of claim 19, wherein generating the data presentation interface further comprises simultaneously displaying a third indication of the report data presentation object and a fourth indication of the dashboard data presentation object on the data presentation interface.

\* \* \* \* \*